(12) United States Patent
Crabtree et al.

(10) Patent No.: US 9,126,135 B2
(45) Date of Patent: Sep. 8, 2015

(54) V-BANK AIR FILTRATION SYSTEM SUCH AS FOR ANIMAL CONFINEMENT

(75) Inventors: LaMonte A. Crabtree, LaGrange, KY (US); Ronald Jay Geil, Jr., LaGrange, KY (US); Richard Keith Chesson, Jr., Louisville, KY (US); Jeffrey A. Sinclair, Clarksville, IN (US)

(73) Assignee: Clarcor Air Filtration Products, Inc., Jeffersonville, IN (US)

( * ) Notice: Subject to any disclaimer, the term of this patent is extended or adjusted under 35 U.S.C. 154(b) by 136 days.

(21) Appl. No.: 13/480,018

(22) Filed: May 24, 2012

(65) Prior Publication Data

US 2012/0291406 A1    Nov. 22, 2012

Related U.S. Application Data

(63) Continuation-in-part of application No. 13/165,379, filed on Jun. 21, 2011, now Pat. No. 8,747,505.

(60) Provisional application No. 61/357,437, filed on Jun. 22, 2010, provisional application No. 61/490,896, filed on May 27, 2011.

(51) Int. Cl.
*B01D 46/00* (2006.01)
*B01D 46/12* (2006.01)
(Continued)

(52) U.S. Cl.
CPC ............ *B01D 46/125* (2013.01); *B01D 46/001* (2013.01); *B01D 46/002* (2013.01); *B01D 46/0005* (2013.01); *B01D 46/0023* (2013.01); *B01D 46/10* (2013.01); *B01D 46/521* (2013.01)

(58) Field of Classification Search
CPC ........ B01D 46/02; B01D 46/05; B01D 46/10; B01D 46/23; B01D 46/125; B01D 46/521

USPC ................ 55/482–484, 493, 497, 521, 385.1, 55/385.2, 481, 506, DIG. 29; 119/419, 119/444, 447
See application file for complete search history.

(56) References Cited

U.S. PATENT DOCUMENTS 3,624,161 A    11/1971  Bub
3,744,216 A     7/1973  Holloran
(Continued)

FOREIGN PATENT DOCUMENTS

CA       2036639 A1    9/1991
DE    19755466 A1    6/1999
(Continued)

OTHER PUBLICATIONS

U.S. Appl. No. 13/479,765, filed May 24, 2012, Crabtree et al.
(Continued)

*Primary Examiner* — Jason M Greene
*Assistant Examiner* — Karla Hawkins
(74) *Attorney, Agent, or Firm* — Reinhart Boerner Van Deuren P.C.

(57) ABSTRACT

A filter system includes a housing having an inlet opening surrounded by a sealing surface, an outlet opening. The housing may be rotational molded or be configured to be nestable with additional housings for shipping purposes. The system may also be configured such that the filter to be mounted therewith can be placed interior to the filter housing during shipment. A V-bank filter or a single-header box filter is positioned in the inlet opening, has a flange in general alignment with the sealing surface, and a plurality of filter media sections projecting away from the flange and into the housing interior. A seal is disposed between the flange of the V-bank or single-header box filter and sealing surface. A pre-filter, such as a panel filter, may be provided upstream from the primary filter.

15 Claims, 19 Drawing Sheets

(51) Int. Cl.
*B01D 46/10* (2006.01)
*B01D 46/52* (2006.01)

(56) References Cited

U.S. PATENT DOCUMENTS

| | | | |
|---|---|---|---|
| 3,793,813 A | 2/1974 | McAllister |
| 3,925,043 A | 12/1975 | Matrone et al. |
| 4,225,328 A | 9/1980 | Stiehl |
| 4,810,269 A | 3/1989 | Stackhouse et al. |
| 4,865,637 A | 9/1989 | Gruber |
| 5,288,298 A | 2/1994 | Aston |
| 5,290,345 A | 3/1994 | Osendorf et al. |
| 5,290,447 A | 3/1994 | Lippold |
| 5,322,213 A | 6/1994 | Carter et al. |
| 5,351,846 A | 10/1994 | Carter |
| 5,476,526 A | 12/1995 | Attermeyer |
| 5,496,389 A | 3/1996 | Wilcox |
| 5,501,794 A | 3/1996 | Van de Graaf et al. |
| 5,512,172 A | 4/1996 | Marble |
| 5,531,892 A | 7/1996 | Duffy |
| 5,593,470 A | 1/1997 | Shagott et al. |
| 5,622,543 A | 4/1997 | Yang |
| 5,690,719 A | 11/1997 | Hodge |
| 5,792,229 A | 8/1998 | Sassa et al. |
| 5,804,014 A * | 9/1998 | Kahler ........................ 156/204 |
| 5,810,898 A | 9/1998 | Miller |
| 5,820,646 A | 10/1998 | Gillingham et al. |
| 5,853,445 A | 12/1998 | Wong et al. |
| 5,908,598 A | 6/1999 | Rousseau et al. |
| 6,099,612 A | 8/2000 | Bartos |
| 6,152,996 A | 11/2000 | Linnersten et al. |
| 6,156,089 A | 12/2000 | Stemmer et al. |
| 6,174,342 B1 | 1/2001 | Jeanseau |
| 6,179,891 B1 | 1/2001 | Knudsen et al. |
| 6,203,592 B1 | 3/2001 | Carawan |
| 6,214,076 B1 | 4/2001 | Beier et al. |
| 6,293,983 B1 | 9/2001 | More |
| 6,312,489 B1 | 11/2001 | Ernst et al. |
| 6,315,805 B1 | 11/2001 | Strauss |
| 6,319,307 B1 | 11/2001 | Shanks et al. |
| 6,321,637 B1 | 11/2001 | Shanks et al. |
| 6,348,085 B1 | 2/2002 | Tokar et al. |
| 6,361,577 B1 | 3/2002 | Unrath et al. |
| 6,406,657 B1 | 6/2002 | Eitzman et al. |
| 6,419,871 B1 | 7/2002 | Ogale |
| 6,447,566 B1 | 9/2002 | Rivera et al. |
| 6,685,833 B2 | 2/2004 | Lippold |
| 6,824,581 B1 | 11/2004 | Tate et al. |
| 7,959,700 B2 | 6/2011 | Kidman |
| 2005/0150812 A1 | 7/2005 | Carter |
| 2006/0021302 A1 | 2/2006 | Bernard |
| 2009/0193773 A1 | 8/2009 | Sundvik et al. |
| 2009/0301402 A1* | 12/2009 | Devine et al. ................. 119/447 |
| 2010/0192528 A1 | 8/2010 | Mann et al. |
| 2010/0251678 A1 | 10/2010 | Mann et al. |
| 2010/0313757 A1 | 12/2010 | Crabtree et al. |
| 2010/0313760 A1 | 12/2010 | Crabtree et al. |
| 2011/0308210 A1 | 12/2011 | Crabtree et al. |

FOREIGN PATENT DOCUMENTS

| | | |
|---|---|---|
| GB | 2 252 922 | 8/1992 |
| JP | 3146110 | 6/1991 |
| JP | 6269624 | 9/1994 |
| JP | 7323217 | 12/1995 |
| JP | 08/242718 A | 9/1996 |
| JP | 10-019367 A | 1/1998 |
| JP | 2008-031967 A | 2/2008 |
| KR | 20-0445119 Y1 | 6/2009 |
| WO | WO 01/93990 A1 | 12/2001 |

OTHER PUBLICATIONS

U.S. Appl. No. 13/479,791, filed May 24, 2012, Crabtree et al.
U.S. Appl. No. 13/479,841, filed May 24, 2012, Ball et al.
U.S. Appl. No. 13/479,880, filed May 24, 2012, Crabtree.
U.S. Appl. No. 61/490,896, filed May 27, 2011, Crabtree et al.

* cited by examiner

V-BANK AIR FILTRATION SYSTEM SUCH AS FOR ANIMAL CONFINEMENT

CROSS-REFERENCE TO RELATED PATENT APPLICATIONS

This patent application is a continuation-in-part of co-pending U.S. patent application Ser. No. 13/165,379, filed Jun. 21, 2011, which claims the benefit of U.S. Provisional Patent Application No. 61/357,437, filed Jun. 22, 2010, the entire teachings and disclosure of which are incorporated herein by reference thereto. This patent application claims the benefit of U.S. Provisional Patent Application No. 61/490,896, filed May 27, 2011, the entire teachings and disclosure of which are incorporated herein by reference thereto.

FIELD OF THE INVENTION

This invention generally relates to air filtrations systems used in animal confinement facilities or in other filtration applications.

BACKGROUND OF THE INVENTION

One of the concerns in agricultural animal confinement facilities, particularly in the agricultural swine industry, is the control of the spread of disease. For example, disease agents such as mycoplasma, the swine influenza virus, and the porcine reproductive and respiratory syndrome virus (PRRSV) have had a significant negative impact on swine production. It has been estimated that PRRSV alone may increase the average cost of swine production by $5.60 to $7.62 per head.

One method that has proven effective is reducing the spread of the aforementioned disease agents is filtration of the air in animal confinement facilities. For example, high-efficiency air filters have proven to be effective at reducing the rate of airborne transmission of these disease agents. One of the challenges for the swine production industry is how to best provide the needed high-efficiency air filtration in a practical manner at the lowest cost, with ease of filter change out, and with reliability for the environmental application.

V-bank filters have been used in applications involving air filtration in animal confinement facilities where both large amounts of filtration media and high air flow rates are desired. A V-bank filter typically includes two or more pairs of panel filters, for example, where each pair of adjacent panel filters is arranged in a V-shaped configuration. In these applications, the panel filters typically include pleated filter media.

Embodiments of the present invention are directed toward improvements over the state of the art.

BRIEF SUMMARY OF THE INVENTION

In one aspect, embodiments of the invention provide a filter system that includes a housing having a generally rectangular inlet opening through one side thereof, and an outlet opening through a different side. The rectangular inlet opening is surrounded by a generally rectangular sealing surface. In an embodiment, the filter system also includes a door having a generally rectangular seating surface, with the seating surface surrounding a through-port opening. The door is movable between an open position and a closed position relative to the housing, and the through port opening is aligned with the rectangular inlet opening when the door is in the closed position. In at least one embodiment, the filter system has a hinge connecting the door to the housing, and the door pivots between open and closed positions about the hinge. Further, in certain embodiments, a generally rectangular panel pre-filter is seated along the rectangular seating surface of the door, and at least one V-bank primary filter is positioned in the rectangular inlet opening. In a particular embodiment, the V-bank primary filter has a generally rectangular peripheral flange in general alignment with the generally rectangular sealing surface. Further, the V-bank primary filter has a plurality of filter media sections projecting away from the peripheral flange and into the interior of the housing. The filter system further includes a latch having cooperating components between the door and the housing, such that the latch is adapted to keep the at least one generally rectangular panel pre-filter positioned inline and upstream of the at least one V-bank primary filter. Additionally, the filter system includes a seal between the generally rectangular peripheral flange of the V-bank primary filter and the generally rectangular sealing surface.

In another aspect, embodiments of the invention provide a filter system that includes a housing having an inlet opening and an outlet opening, and a V-bank filter having a flange configured to seat against a perimeter portion of the inlet opening, and disposed between the inlet and outlet opening. In an embodiment of the invention, the filter system also includes a pivoting door configured to move between an open position and a closed position. In the closed position, the door covers the inlet opening, and, in the open position, the door allows for the removal and installation of the V-bank filter. In a particular embodiment, the filter system further includes a panel filter disposed within the pivoting door. The panel filter is configured to pre-filter air entering through the inlet opening to the V-bank filter.

In still another aspect, embodiments of the invention provide a filter system that includes a housing having an inlet opening and an outlet opening, and a V-bank filter having a flange configured to seat against a perimeter portion of the inlet opening. In an embodiment, the flange is disposed between the inlet and outlet opening. An embodiment of the filter system also includes a pair of cooperating retainers, including a first retainer and a second retainer on opposing sides of the outlet opening. Each retainer is generally step-shaped, with a mounting portion, a spacer portion and a retainer portion. The mounting portion is mounted to the housing, and the spacer portion spaces the retainer portion away from the perimeter portion in spaced relation to trap the flange of the V-bank filter therein. At least one of the retainers is movable to accommodate installation and removal of the V-bank filter. In an embodiment of the invention, a seal is disposed between the flange and the perimeter portion of the housing.

In yet another aspect, embodiments of the invention provide a replaceable V-bank filter for use with a housing having an inlet opening and an outlet opening, with the housing having an outer upstream rectangular sealing surface and upper and lower retainers defining channels therein. An embodiment of the replaceable V-bank filter includes a generally rectangular frame having a peripheral and generally rectangular flange surrounding an inlet, a generally rectangular seal means along a first side of the flange for sealing against the rectangular sealing surface of the housing, and a generally rectangular seat means along a second side of the flange for seating against the upper and lower retainer. In at least one embodiment, the generally rectangular seat means is positioned, and has sufficient depth, to facilitate compression of the generally rectangular seal means relative to the rectangular sealing surface of the housing. This compression provides for said sealing when employed in the upper and lower retainers. An embodiment of the replaceable V-bank filter has a plurality of pleated panel filters. Each panel filter is supported by the generally rectangular frame and projects in a direction away from the flange. Further, pairs of the pleated panel filters are arranged in generally V-shaped configurations, with adjacent ends of adjacent panel filters being joined by bridging sections that extend transversely relative to two opposed sides of the generally rectangular frame.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

As shown in FIGS. 1-5 below, embodiments of the present invention include a filter housing with a pivoting door and a sliding latch that permit the quick removal and installation of two or more V-bank filter elements, but also facilitate an airtight seal between the housing and filter element. The novel filter housing configuration described herein simplifies the maintenance, provides for a practical and reliable filter replacement process, and, thus, and may lower the costs associated with the operation of animal confinement facilities.

Figure 1:
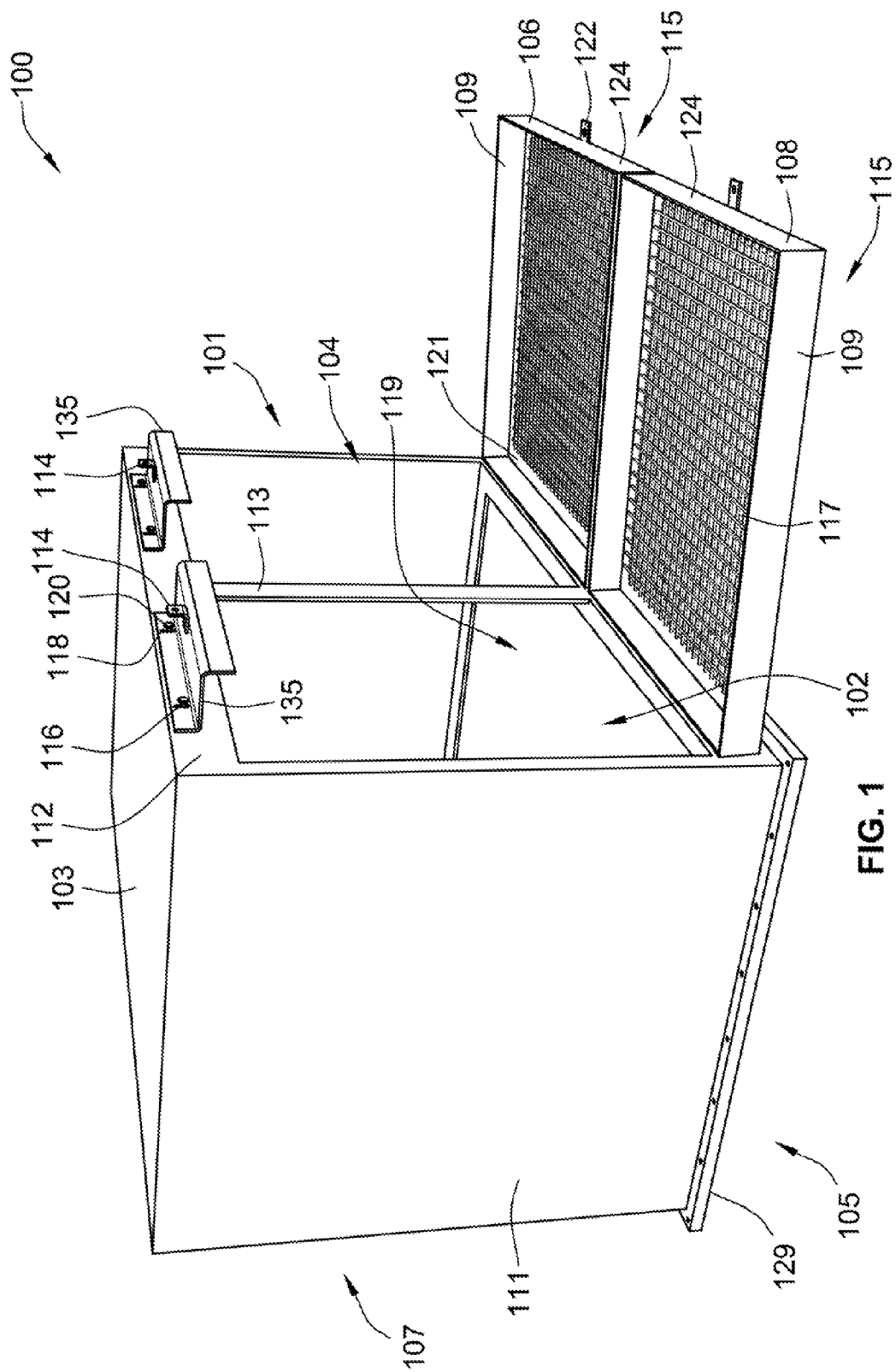
FIG. 1 is a perspective view of a filter housing constructed in accordance with an embodiment of the invention.

FIG. 1 illustrates a filter housing 100 for use in an animal confinement facility, constructed in accordance with an embodiment of the invention. In the embodiment shown, the filter housing 100 is substantially box-shaped, and may be formed from sheet metal or other suitable material. Filter housing 100 has a front side 101, a top side 103, a bottom side 105, a rear side 107, and two lateral sides 111. The front side 101 of the filter housing 100 has two rectangular openings to provide inlets, 102, 104 separated by a divider such as vertical post 113, and each configured to accept a V-bank filter element (see FIG. 4). The bottom side 105 has a large rectangular outlet opening 119 that is common to all of the inlets. A flange 129 runs around a perimeter of the bottom side 105 of the filter housing 100. In an embodiment of the invention, the flange 129 has openings for fasteners, which may be used, for example, in the installation of the filter housing 100.

In embodiments of the inventions, the rear side 107 of the filter housing is very similar or identical to the front side 101 in terms of the inlet openings 102, 104, pivoting doors 106, 108, latching mechanisms, and filter elements employed. Therefore, for the sake of brevity, the following description of the filter housing 101 refers only to the front side 101. However, it should be noted that all of the features and elements shown and describes with respect to the front side 101 of the filter housing applies equally to the rear side 107.

Filter housing 100 also includes two pivoting doors 106, 108 attached to the filter housing 100 via hinges (shown in FIG. 9) located along the bottom side of the two rectangular openings 102, 104. However, as will be discussed below, it is also contemplated that pivoting doors could be hinged at the top side or on the lateral sides of the two rectangular openings 102, 104. Each pivoting door 106, 108 has a rectangular frame 109 with a seating surface 121 surrounding a through-port opening 115 in which the panel pre-filters may nest. The seating surface 121 may comprise a recessed region generally facing the V-Bank filter when in the close position. In at least one embodiment, the rectangular frame 109 supports a protective grate 117 along the seating surface 121 and across the through-port opening 115 such that the door 106, 108 is capable of holding a panel pre-filter 136 (shown in FIG. 4). Furthermore, in at least one embodiment, the grate 117 comprises a wire mesh grate having a plurality of horizontal and vertical wires spaced far enough apart so as not to restrict the flow of air through the filter housing 100, but also to protect the filter media and prevent the ingress of large objects.

FIG. 1 shows that along a top portion 112 of the front of filter housing 100 there are two latches 114, one disposed on each upper retainer 135. In an embodiment of the invention, each latch 114, or has a cooperating components on the corresponding door 106, 108 in the form of a first L-shaped bracket 122. As will be explained more fully below, the latch 114 is configured to work with first L-shaped bracket 122 to secure the doors 106, 108 in the closed position. In an embodiment of the invention, the latch 114 comprises a second L-shaped bracket 114.

In the embodiment of FIG. 1, one portion of the latches 114 is formed and secured upon the upper retainer 135 on the housing, and an L-shaped bracket 122 on the door. Each upper retainer 135 may be step-shaped, as shown, and each includes two slots 116 (see close-up view of FIG. 2 also), which facilitate vertical sliding adjustment and movement, which helps to facilitate installation and clamping of the V-Bank filter elements 138 in position. The slots 116 are configured such that a fastener can slide vertical when unfastened—such as a screw 118 (see close-up view of FIG. 2 also—and realizing it screws into a threaded hole in housing) with a knob 120 (see close-up view of FIG. 2 also). The knob 120 is attached at one end of the screw 118 to allow for manual adjustment can be inserted through the slot 116 and assembled to a threaded hole in the filter housing 100. The length of the slots 116 allows the upper retainer 135 to be moved up or down when the screws 118 are loosened. Also, the screw 118 is relatively long so that the upper retainer 135 can be moved in horizontally forward and away from the front of the housing 100 between unclamped and clamped positions. Thus, there are two axes of adjustment for V-bank installation and clamping—both vertical and horizontal adjustment, which also allows the upper retainer 135 to be pivoted or canted during installation to afford clearance for the upper end of a V-bank flange 142 and gaskets.

Figure 2:
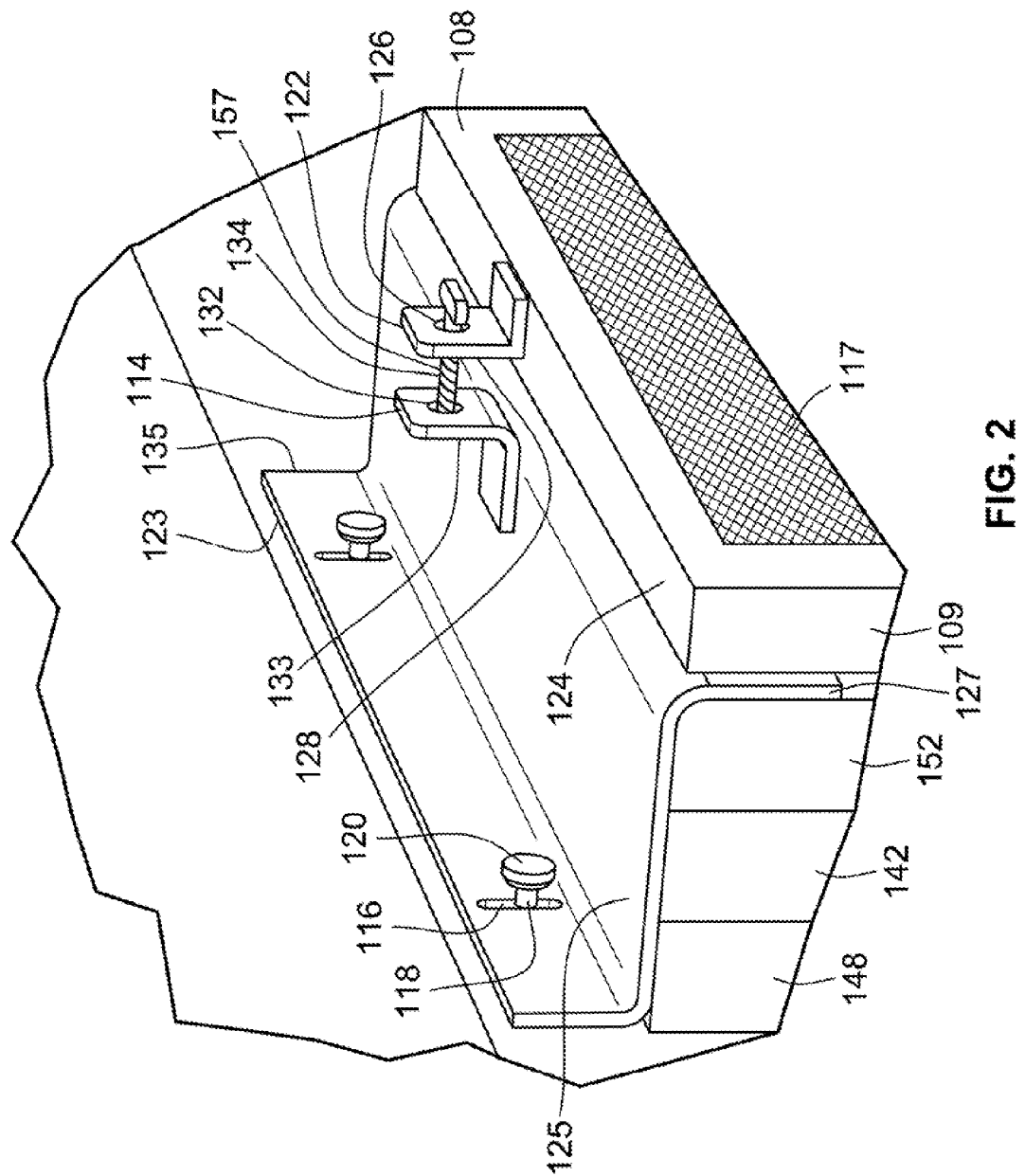
FIG. 2 is a close up view of a portion of the filter housing of FIG. 1.

In an embodiment of the invention shown in FIG. 2, each upper retainer 135 has a mounting portion 123, a spacer portion 125, and a retainer portion 127. The mounting portion 123 is attached to the top of the front side 101 of the housing 100 and defines the slots 116. The spacer portion 125 is configured to accommodate the flange 142 and gasket seals of the V-bank filter element 138. The retainer portion 127 is configured to keep the aforementioned V-bank flange 142 and associated gasket seals in sealing engagement with a seating surface 144 (shown in FIG. 4) around the perimeter of the rectangular openings 102, 104 of the housing 100. By manually actuating the knob 120, the V-bank filter element 138 can be secured and sealingly clamped with axial compression in the gaskets against the front seating surface 144 of the housing 100, or can be loosened to facilitate release for removal and installation purposes. Actuating the knob 120 can also secure the panel pre-filter 136 (shown in FIG. 4) in the grate 117 by compressing the V-bank filter element 138 gaskets against the panel pre-filter 136.

Figure 3:
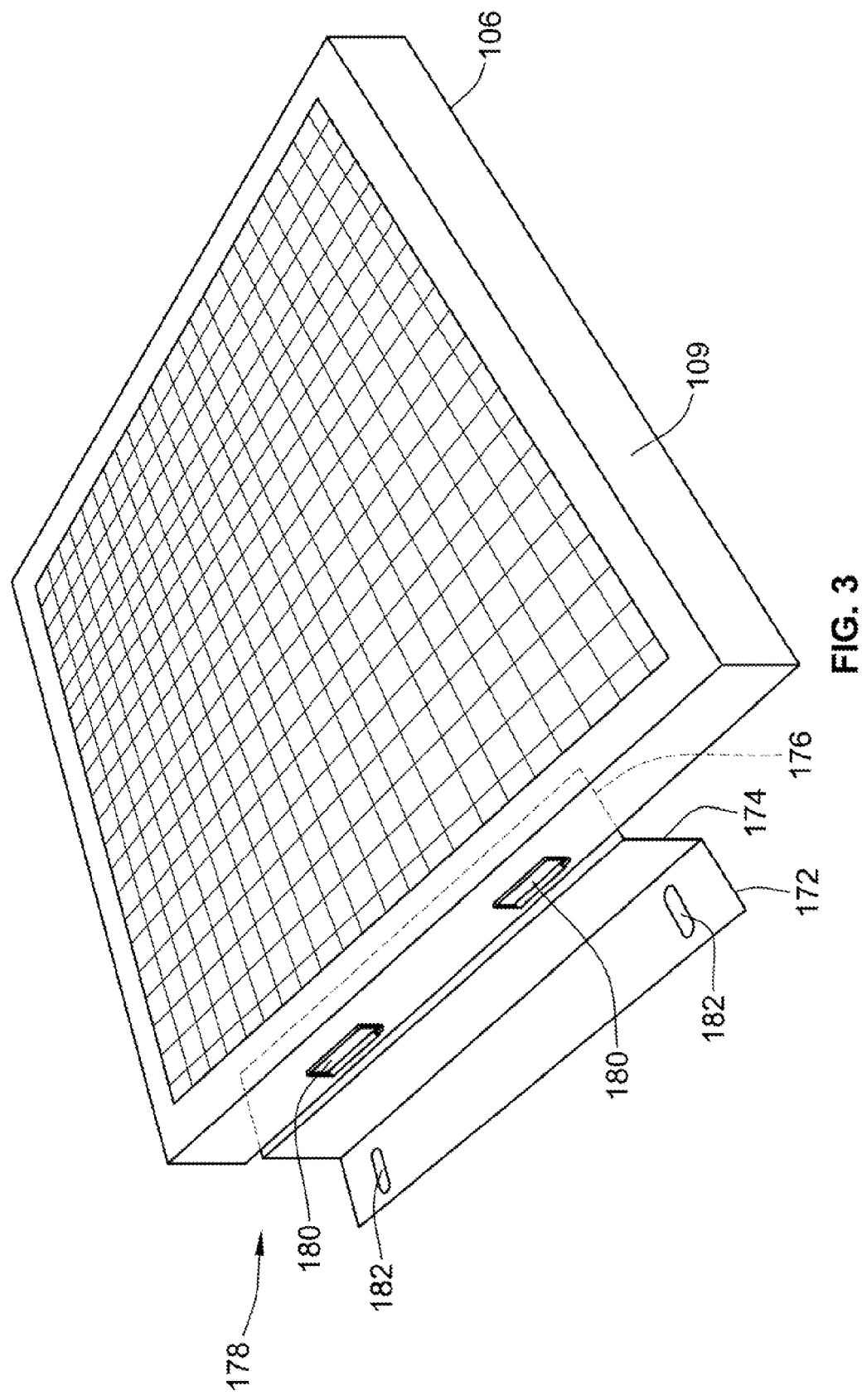
FIG. 3 is a perspective view of a door on the filter housing of FIG. 1, the door including a lower retainer.

In a particular embodiment of the invention, the filter housing 100 includes a lower retainer for each door 106, 108. Further, in at least one embodiment of the invention, the lower retainer is identical, or very similar to the upper retainer 135. FIG. 3 is a perspective view of a portion of filter housing 100 that includes a lower retainer 170. Similar to the upper retainer 135, the lower retainer 170 may have a stepped profile and include a mounting portion 172, a spacer portion 174, and a retainer portion 176. In FIG. 3, the retainer portion 176 is largely hidden by the rectangular frame 109 of door 106, 108. The lower retainer 170 is attached to the door 106 at a bottom side 178 of the rectangular frame 109 via one or more hinged plates 180. The one or more hinged plates may be attached to the bottom side 178 of the rectangular frame 109 by welding, brazing, soldering, or using a fastener of some type. The mounting portion 172 is attached to the bottom of the front side 101 of the housing 100, and, in the embodiment of FIG. 3, includes two slots 182 that allow for vertical adjustment of the door 106, 108 to facilitate changing of the V-bank filter 138 or the panel pre-filter 136.

The slots 182 are configured such that a fastener can slide vertical when unfastened—such as a screw 118 (not shown in FIG. 3), which can be assembled into a threaded hole in filter housing 100 with a knob 120 (not shown in FIG. 3). The knob 120 is attached at one end of the screw 118 to allow for manual adjustment can be inserted through the slot 182 and assembled to a threaded hole in the filter housing 100. The length of the slots 182 allows the lower retainer 170 to be moved up or down when the screws 118 are loosened. Also, the screw 118 may be relatively long so that the lower retainer 170 can be moved in horizontally forward and away from the front of the housing 100 between unclamped and clamped positions. The lower retainer 170 is secured to the filter housing 100 such that the screw 118 can be inserted through slot 182 and the knob 120 tightened against the mounting portion 172 to keep the door 106, 108 from moving. The spacer portion 174 is configured to accommodate the flange 142 and gasket seals of the V-bank filter element 138. The retainer portion 176 is configured to keep the aforementioned V-bank flange 142 and associated gasket seals in sealing engagement with a seating surface 144 (shown in FIG. 4) around the perimeter of the rectangular openings 102, 104 of the housing 100. By manually actuating the knob 120, the V-bank filter element 138 can be secured and sealingly clamped with axial compression in the gaskets against the front seating surface 144 of the housing 100, or can be loosened to facilitate release for removal and installation purposes. Actuating the knob 120 can also secure the panel pre-filter 136 (shown in FIG. 4) in the grate 117 by compressing the V-bank filter element 138 gaskets against the panel pre-filter 136.

Referring again to FIG. 2, an embodiment of the invention is illustrated in which each pivoting door 106, 108 also includes a first L-shaped bracket 122 attached to a top side 124 of the pivoting door 106, 108. The first L-shaped bracket 122 has a hole or opening 126 in a vertical portion 128 of the first L-shaped bracket 122. As stated above, each upper retainer 135 includes the latch 114, which in at least one embodiment is second L-shaped bracket 114 with a hole or opening 132 in a vertical portion 133 of the second L-shaped bracket 114. The opening 132 in each of the second L-shaped brackets 114 aligns with the opening 126 in the corresponding first L-shaped bracket 122 such that a locking bolt 134 can be inserted through both openings 126, 132 to hold the pivoting door 106, 108 in the closed or shut position. At least opening 132 is threaded, or potentially both openings are threaded such that locking bolt 134 having a threaded portion 157 (with a knob such as t-handle) can be selectively secured and released.

Figure 4:
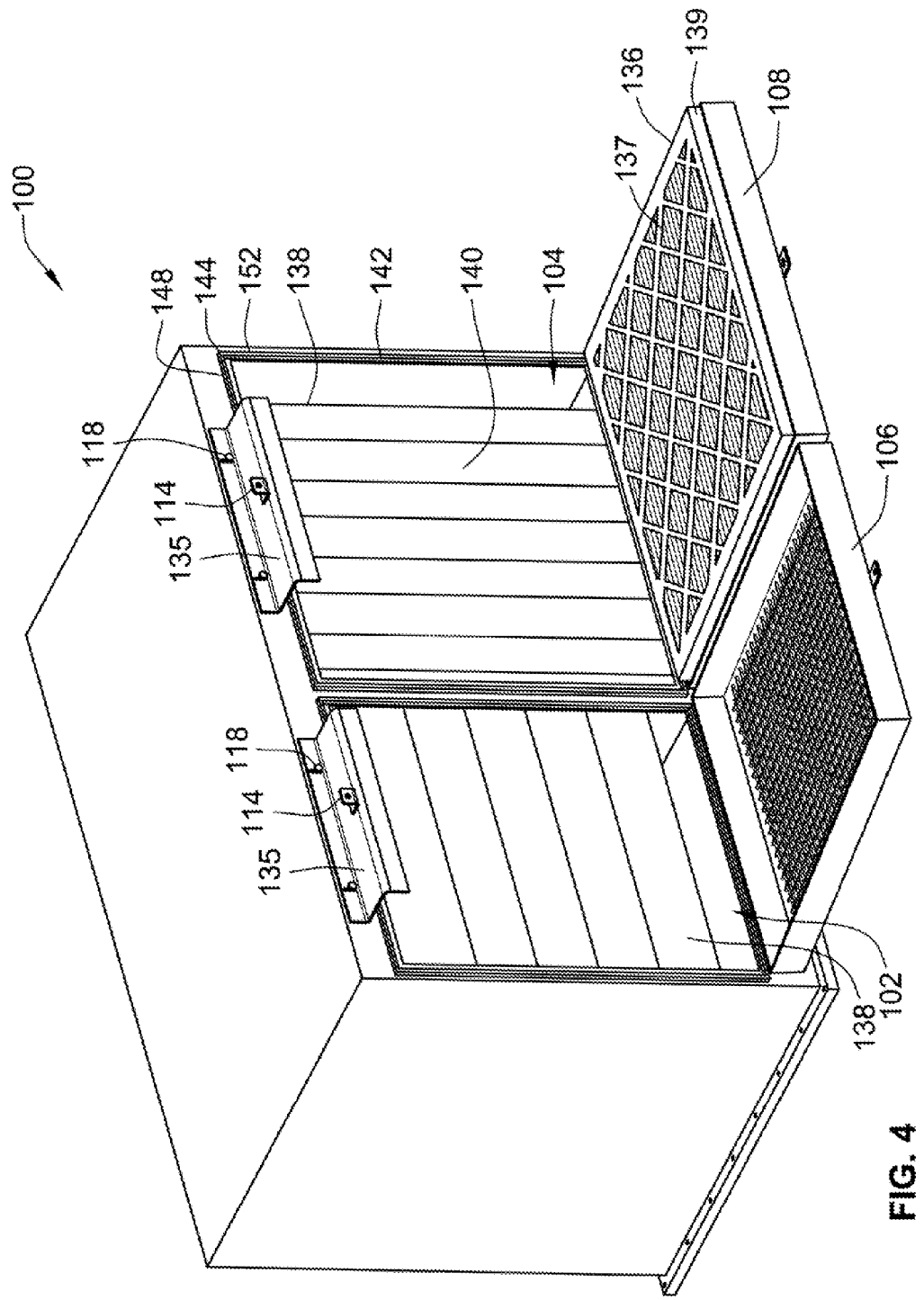
FIG. 4 is a perspective view of the filter housing of FIG. 1 with a V-bank filter, panel pre-filter, and door with protective grate.

FIG. 4 illustrates the filter housing 100 of FIG. 1 with exemplary filter elements installed therein. Because the illustrated embodiment of the filter housing 100 is configured with two similar openings, doors, upper retainers and latches, only one side of the filter housing 100 and corresponding filter elements will be described below, as the description will be the same for the other side of the filter housing 100. Pivoting door 108 is shown with the panel pre-filter 136 installed within the frame 109 of the pivoting door 108, though in normal operation, each pivoting door 106, 108 would have the panel pre-filter 136 installed therein. When the door 106, 108 is in the open position and during movement to the closed position (with the hinge to the door at the bottom), the panel pre-filter 136 rests in position via the forces of gravity such that no additional clamping is even required and the panel pre-filter 136 may be simply laid into the nesting position along the L shaped seating surface 121 and easily removed therefore as well. Further, one step securement of the pre-filter 136 is accomplished with the latch 114 upon closure of the door 106, 108.

Further as an advantage, as can be seen in FIG. 4, one side of the panel pre-filter 136 is protected by the grate 117 of the pivoting door 108, while the other side of the panel filter is positioned adjacent to a V-bank filter element 138 when the pivoting door 108 is in the closed position. In a particular embodiment, the generally rectangular panel pre-filter 136 fits loosely into the frame 109 of the pivoting door 108, and is secured in place only when the pivoting door 108 is closed. In an alternate embodiment, the panel pre-filter 136 is held in by fastening and/or clip devices (not shown) disposed on the frame 109 of the pivoting door 108, or the panel filter may be press fit into the frame 109 of the pivoting door 108, and held in place by friction.

When positioned upstream from the V-bank filter element 138 within the frame 109 of the door 106, 108, the panel pre-filter 136 is configured to pre-filter air entering into the V-bank filter element 138 by removing relatively larger particles and dust from the air stream, for example, before those larger particles can enter the V-bank filter element 138. One effect of the pre-filtering panel pre-filter 136 is to lengthen the useful life of the V-bank filter element 138. In some embodiments of the invention, the panel pre-filter 136 includes pleated pre-filter media 137 housed within a rectangular paperboard frame 139. Further, in certain embodiments the panel pre-filter media 137 is rated at MERV 14 or lower.

Figure 5:
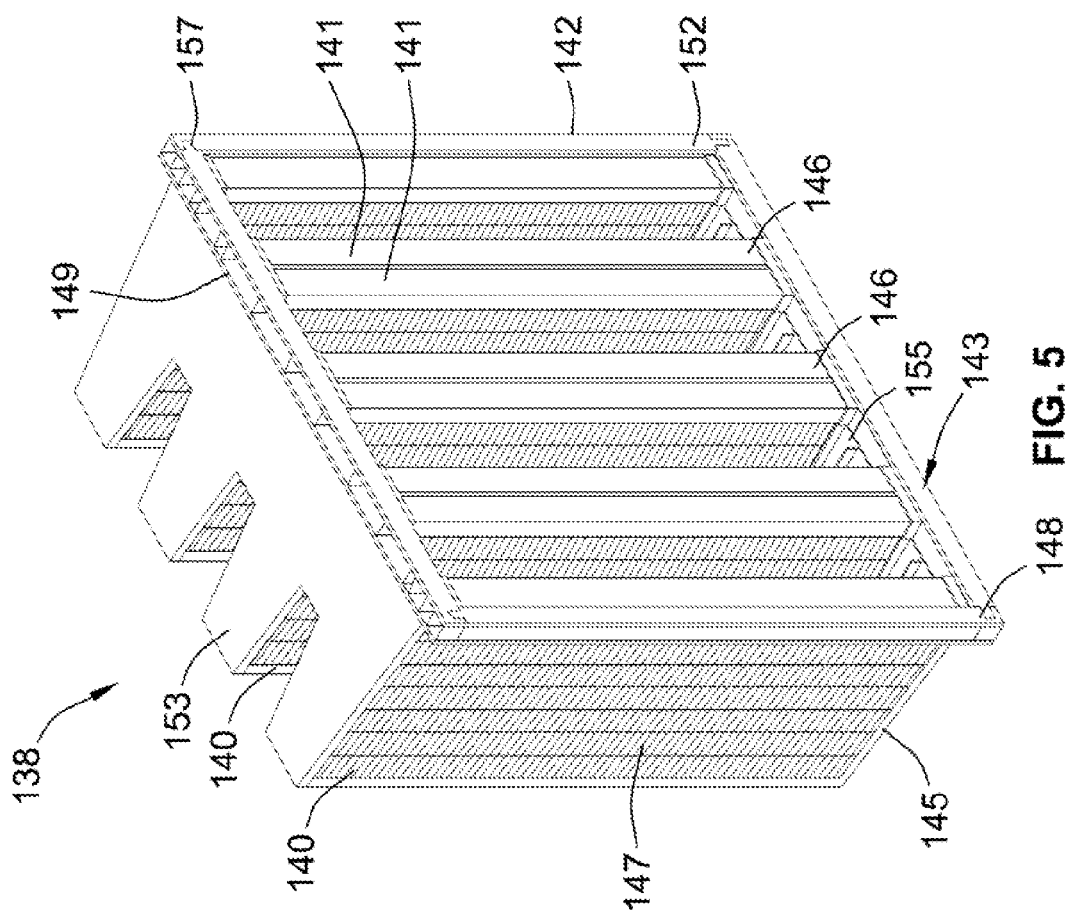
FIG. 5 is a perspective view of a V-bank filter, constructed in accordance with an embodiment of the invention.

Referring now to FIG. 5, which illustrates a perspective view of the V-bank filter element 138 constructed in accordance with an embodiment of the invention. The V-bank filter 138 comprises a series of panel filters 140 each having a frame 145 supporting a pleated filter media 147 panel. In some embodiments of the invention the filter media 147 is pleated and the frame 145 is constructed of a rigid material such as plastic, although paperboard frames are more common for pleated panel filter elements. The entire assembly which comprises the V-bank filter element 138 is supported by a frame having a peripheral and outwardly projecting rectangular flange 142, in which each panel filter 140 is attached to the adjacent panel filter 140 along a side edge 141, and the panel filters 140 are angled such that any two adjacent panel filters 140 come together in a V-shaped configuration. In at least one embodiment of the invention, adjacent ends or side edges 141 of adjacent panel filters 140 are joined by bridging sections 146 that extend transversely relative to two opposed sides of the edges of the flange 142. A top panel 153 and bottom panel 155 (also referred to as end panels) cover the top and bottom portions, respectively, of the V-bank filter element 138, and the panels 153, 155 create a seal with each of the panel filters 140 such that air flowing into the V-bank filter element 138 must flow through the filter media 147. It is also contemplated that non-pleated filter panels may also be used to construct the V-bank filter element 138, such as a collection of other panel filters arranged in a V-bank configuration.

The flange 142 may be formed from a rigid material such as a hard plastic or metal. In at least one embodiment, the flange 142 is integrally formed with end panels 153, 155. A first seal 148 is disposed on a back surface 149 of the flange 142, and a second seal 152 is disposed on a front surface 151 of the flange. The V-bank configuration allows for relatively high amount of filter media surface area per a given volume while permitting a reasonably high air flow rate through the filter assembly. This configuration has proven effective at sufficiently trapping certain airborne viruses that can affect livestock held in animal confinement facilities.

Referring again to FIG. 4, the V-bank filter element 138 is shown in rectangular openings 102, 104 of filter housing 100. As can be seen from FIG. 4, the V-bank filter element 138 can be placed in the filter housing 100 such that the panel filters 140 of the V-bank filter are arranged either vertically or horizontally. In either configuration, an airstream flowing through the inlet openings 102, 104 of the filter housing, flows through the V-bank filter element media and out of the outlet opening 119 in the bottom side 105 of the filter housing 100.

As explained above, the V-bank filter 138 includes the flange or frame 142 along a front side 143 (shown in FIG. 5) of the V-bank filter element 138. The flange 142 is configured to seat against a perimeter portion, or seating surface, 144 of rectangular opening 104. In the embodiment of FIG. 4, the flange 142 is generally rectangular and is in general alignment with the seating surface 144, and each of the plurality of panel filters 140 projects away from the flange 142 towards the interior of the filter housing 100.

In at least one particular embodiment of the invention, the V-bank filter element 138 uses a MERV 16 filter media 147 (shown in FIG. 5). In an alternate embodiment, the V-bank filter element 138 uses a MERV 15 filter media, as determined by the ASHRAE 52.2-2007 standard. In another alternate embodiment of the invention, a HEPA filter may be used as the V-bank filter media. A HEPA filter is configured to capture 99.97 of all particles of 0.3 micron in size. Additionally, a near-HEPA filter, such as that sold under the brand name Micro Guard® LR, which combines low resistance to airflow with efficiencies above 99% for 0.3 micron particles may be used as a single-header box filter in place of the V-bank filter element 138.

Figure 6:
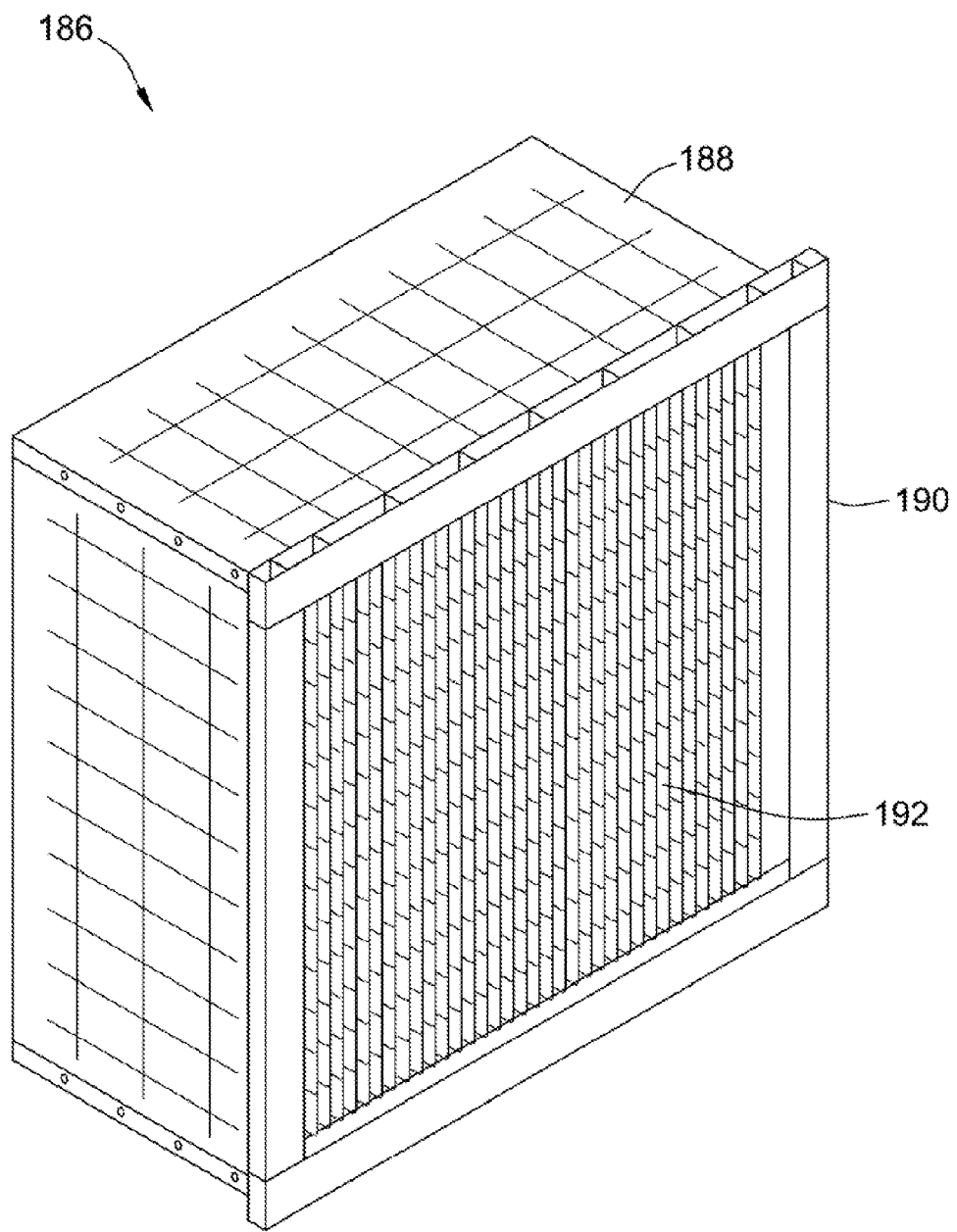
FIG. 6 is a perspective view of a single-header box filter, constructed in accordance with an embodiment of the invention.

FIG. 6 illustrates an exemplary single-header box filter 186, such as might be used in the aforementioned Micro Guard® LR filter. The box filter 186 includes cell sides 188, which in at least one embodiment, are made from a rigid material, including plastics, such as high-impact polystyrene, or metal. In a particular embodiment, a flange 190, made of the same material as the cell sides 188, is attached on a front side of the box filter 186 around the perimeter of cell sides 188. In a particular embodiment, the media is molded into pre-formed channels that form the pleats. A pleated media pack 192 is attached, using an adhesive for example, on interior surfaces of the cell sides 188. In at least one embodiment, the media pack includes embossed pleats and is made from a synthetic, water-resistant material whose performance is substantially unaffected, other than a temporary rise in airflow resistance, by humidity and exposure to moisture levels reasonably expected to be found in airstreams in animal confinement facilities.

Similar to the V-bank filter 138, the single-header box filter 186 would be used with a panel pre-filter 136 to remove large particulates and other contaminants that could clog or otherwise impair the performance of the box filter 186. Typically, pre-filters used with box filter 186 such as the Micro Guard® LR filter will have efficiencies of MERV 8 or higher.

To understand why these filter medias are effective at trapping airborne viruses affecting agricultural livestock, it helps to know the particle size of some typical viruses. For example, there are several swine-specific disease agents that affect pigs and hogs in animal confinement facilities, such as mycoplasma whose particle size typically ranges from 0.3 micron to 0.9 micron. Other swine-specific disease agents include the swine influenza virus whose particle size typically ranges from 0.080 micron to 0.120 micron, the porcine reproductive and respiratory syndrome virus (PRRSV) whose particle size typically ranges from 0.050 micron to 0.065 micron, and the porcine circovirus type 2 (PCV2) whose particle size typically ranges from 0.0017 micron to 0.0022 micron. Due to the small particle size of these viruses, high-efficiency filter medias are needed to filter these particles from the air, or from the small particles that carry these viruses through the air.

To ensure that all airflow through the filter housing 100 flows through the panel pre-filter 136 and V-bank filter 138, in an embodiment of the invention, the first seal 148 is disposed between the flange 142 of the V-bank filter element 138 and the perimeter portion (i.e. seating surface 144) of rectangular opening 104. In at least one embodiment, the first seal 148 is substantially rectangular. Whereas, in at least one embodiment, the flange 142 is made from a rigid material such as a hard plastic or metal, the first seal 148 is made from a compliant gasket material, such as rubber, for example, urethane, plastisol, nitrile or some other synthetic material having similar rubber-like properties, for example poron or neoprene, such that the first seal 148 is capable of creating an airtight seal between the seating surface 144 of rectangular opening 104 and the flange 142 of V-bank filter element 138. While the seals are shown to be flat, O-ring or other profiles known in the art may also be employed; and/or the seals may also be integrally formed on the frame/flange.

In certain embodiments of the invention, the second seal 152 is disposed between the flange 142 of the V-bank filter element 138 and the panel pre-filter 136 so as to create a seal therebetween. This second seal 152 however is less critical as the V-bank filter element 138 will also remove dust. Nevertheless, at least some sealing is desired at this location so as to route most if not all air first through the pre-filter. Whereas the first seal 148 is configured to seat against a side of the flange 142 facing the filter housing 100, the second seal 152 is configured to seat against a side of the flange 142 facing away from the filter housing 100. In an embodiment of the invention, the second seal 152 is substantially rectangular and made from a compliant gasket material, such as the above-mentioned poron or neoprene for example, described above with respect to the first seal 148. The second seal 152 also serve a seating function as the second seal 152 cooperates with the first seal 148 and the flange 142 to provide enough depth and resiliency in the structure overall ensure sufficient compression to create an airtight seal when the screws 118 tighten the upper retainer 135 against the front side of the housing. In embodiments of the invention, the first and second seals 148, 152 range from ⅛-inch to one inch in thickness, though in preferred embodiments, the thickness for these seals 148, 152 is approximately ¼ inch.

Figure 7:
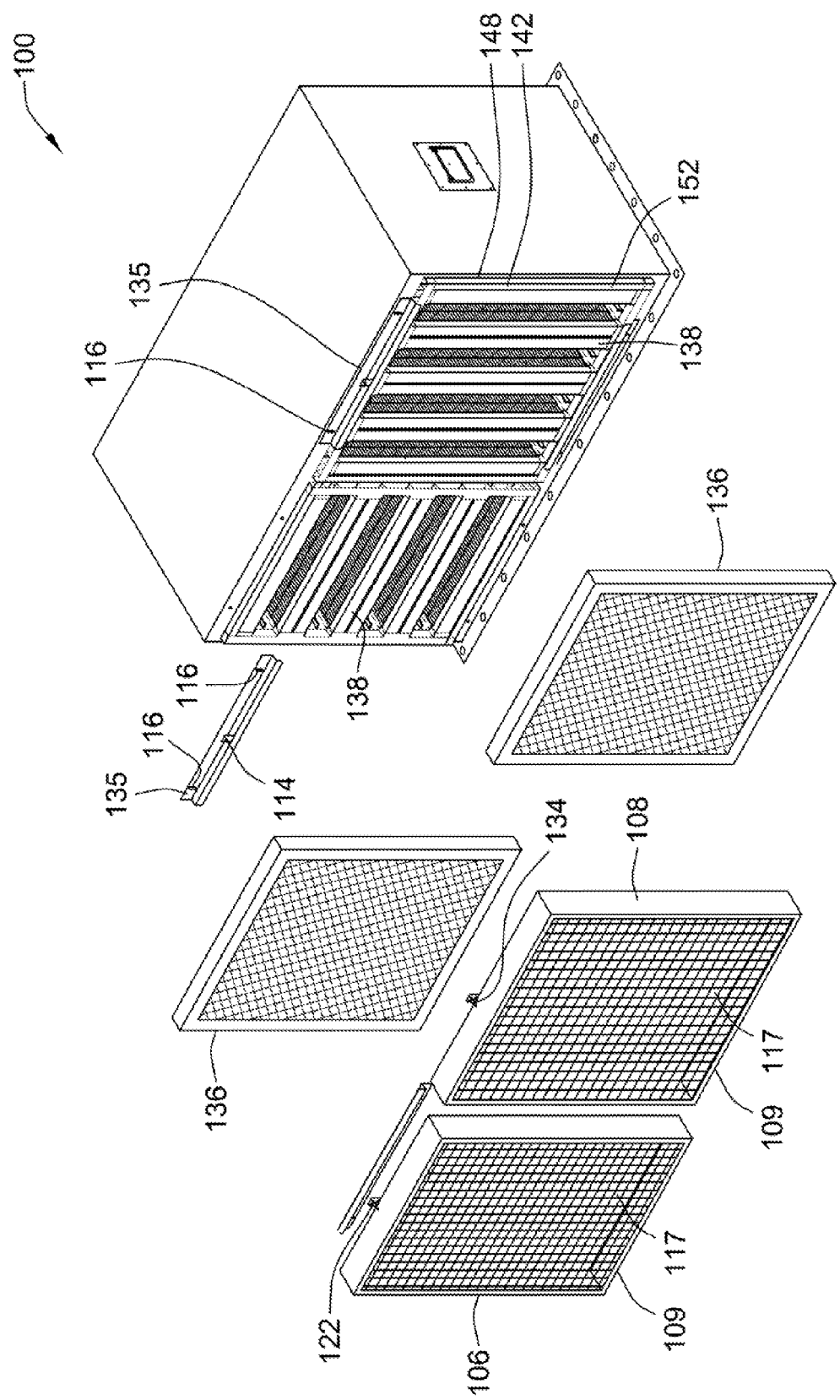
FIG. 7 is an exploded view of a filter housing with a V-bank filter, panel pre-filter, and door with protective grate, according to an embodiment of the invention.

FIG. 7 shows an exploded view of the filter system of FIG. 4 with the doors 106, 108 (with frames 109 and grates 117) detached from the filter housing 100 and each of the upper retainers 135 secured against the flange 142 of the corresponding V-bank filter element 138. The first seal 148, disposed between the flange 142 and the seating surface 144 (shown in FIG. 4) of rectangular opening 102, 104 (shown in FIG. 1) is configured to create a first airtight seal, and the second seal 152 disposed between the flange 142 and the panel pre-filter 136 (shown in FIG. 4) creates a second seal. As can be seen in FIG. 7, the upper retainer 135, which can be raised when screws 118 (shown in FIG. 2) are loosened to properly seat the flange 142 of the V-bank filter 138 against the first seal 148 which is seated against seating surface 144, and is in its lowest position as evidenced by the screws 118 being located at the top of slots 116. When the screws 118 are tightened, the upper retainer 135 compresses the second seal 152, flange 142, and first seal 148 against the seating surface 144 to securely hold the V-bank filter 138 in place. The locking bolt 134 through first L-shaped bracket 122 and second L-shaped bracket 114 secures the door 106, 108 in the closed position such that the panel pre-filter 136 is substantially aligned with the second seal 152, which, in turn, is seated against the flange 142. In an embodiment of the invention, the configuration of components shown on the front side of housing 100 is duplicated on the back side, such that the filter housing 100 has four V-bank filter elements 138, four doors panel pre-filters 136, and four hinged doors 106, 108.

Figure 8:
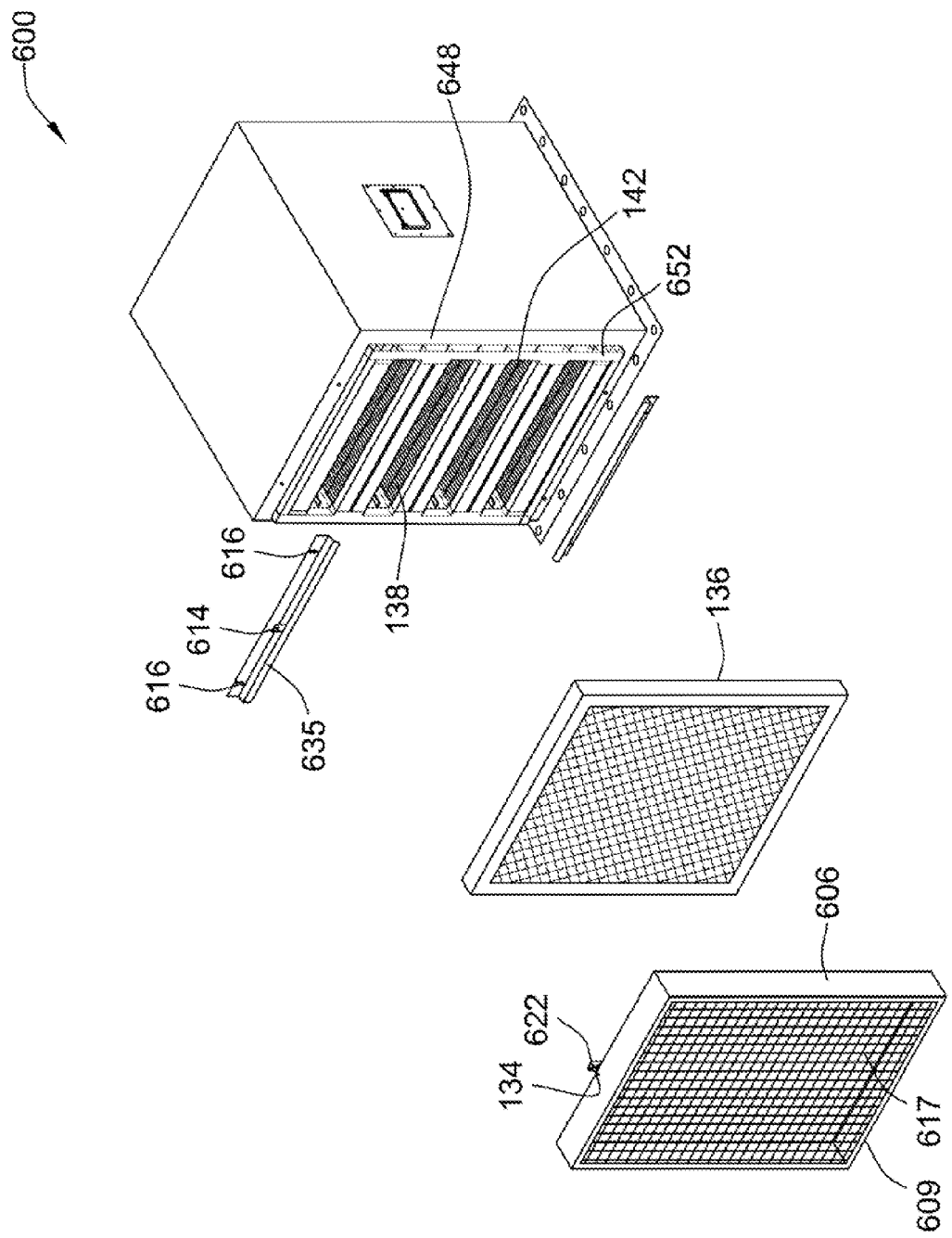
FIG. 8 is an exploded view of a filter housing with a V-bank filter, panel pre-filter, and door with protective grate, according to an alternate embodiment of the invention.

FIG. 8 shows an exploded view of a more compact filter system than that shown in FIG. 7, constructed in accordance with an alternate embodiment of the invention. The compact filter system of FIG. 8 is configured to hold two V-bank or single-header box filters as opposed to the four-filter housing shown in FIG. 7. The filter system of FIG. 8 includes a door 606 (with frames 609 and grates 617) detached from the filter housing 600 and an upper retainer 635 secured against the flange 142 of the corresponding V-bank filter element 138. A first seal 648, disposed between the flange 142 and a seating surface 644 of rectangular opening 602 is configured to create a first airtight seal, and the second seal 652 disposed between the flange 142 and the panel pre-filter 136 (shown in FIG. 4) creates a second seal. As can be seen in FIG. 8, the upper retainer 635, which can be raised when the screws 118 (shown in FIG. 2) are loosened to properly seat the flange 142 of the V-bank filter 138 against the first seal 648 which is seated against seating surface 644, and is in its lowest position as evidenced by the screws 118 being located at the top of slots 616. When the screws 118 are tightened, the upper retainer 635 compresses the second seal 652, flange 142, and first seal 648 against the seating surface 644 to securely hold the V-bank filter 138 in place. The locking bolt 134 through first L-shaped bracket 622 and second L-shaped bracket 614 secures the door 606 in the closed position such that the panel pre-filter 136 is substantially aligned with the second seal 652, which, in turn, is seated against the flange 142. In an embodiment of the invention, the configuration of components shown on the front side of housing 600 is duplicated on the back side of the filter housing 600, such that the filter housing 600 has two V-bank filter elements 138, two door panel pre-filters 136, and two hinged doors 606.

Figure 9:
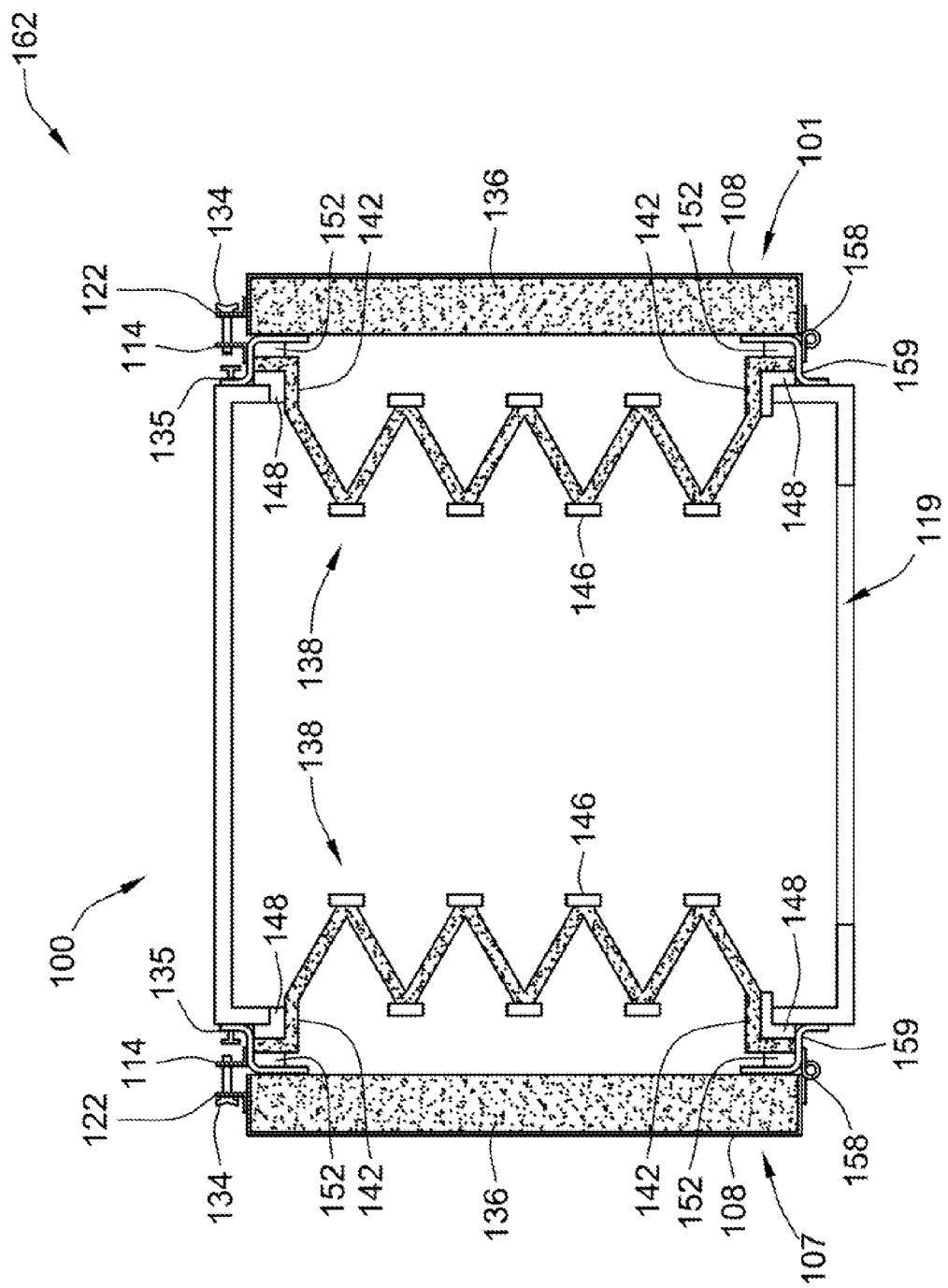
FIG. 9 is a cross-sectional view of a filter system constructed in accordance with an embodiment of the invention.

FIG. 9 shows a cross-sectional view of a filter system 162, constructed in accordance with an embodiment of the invention. The cross-sectional view of FIG. 9 illustrates how the V-bank filter element 138 is held in the filter housing 100 via the flange 142 with a first seal 148 between the flange and housing 100, and with a second seal 152 between the flange 142 and step-shaped upper retainer 135. A second step-shaped lower retainer 159 is shown along the bottom side of the door 108 just above a hinge 158 for the door 108. Like the upper retainer 135, lower retainer 159 also includes a mounting portion, a spacer portion and a retainer portion, but it receives the lower portion of the flange 142 of the V-bank filter element 138 as opposed to the upper portion. Also, this lower retainer 159 is preferably permanently fixed along the bottom, such as being welded or fastened in place (although as similar adjustment means as for the upper retainer could be used—slots and fasteners). During installation or removal, the upper retainer 135 will be loosened to allow for clearance of the upper end of the V-Bank filter element 138. As a consequence, the lower portion of the flange 142, first seal 148, and second seal 152 can be wedged and pivotably installed (or removed) into the lower retainer 159 until the first seal 148 seats against the seating surface 144 of the housing 100. As such, the spacing portion of the lower retainer 159 is dimensioned just slightly smaller than the overall thickness of the V-bank flange 142 and gasket seals 148, 152 on either side.

It should be noted that the placement of the hinge 158 could just as easily be placed along the top side of the door 108, or along either lateral side of the door 108. However, as noted above, the bottom side mounting does provide an advantage of gravitational retention of the panel pre-filter 136 during installation and removal, avoiding secondary securing means. As can be seen from FIG. 9, the filter system 162 is configured such that air can enter the filter system 162 through either the front side 101 or rear side 107 through panel filters 136 and V-bank filter elements 138 located on either side. These air streams exit the filter system 162 through the outlet opening 119.

Figure 10:
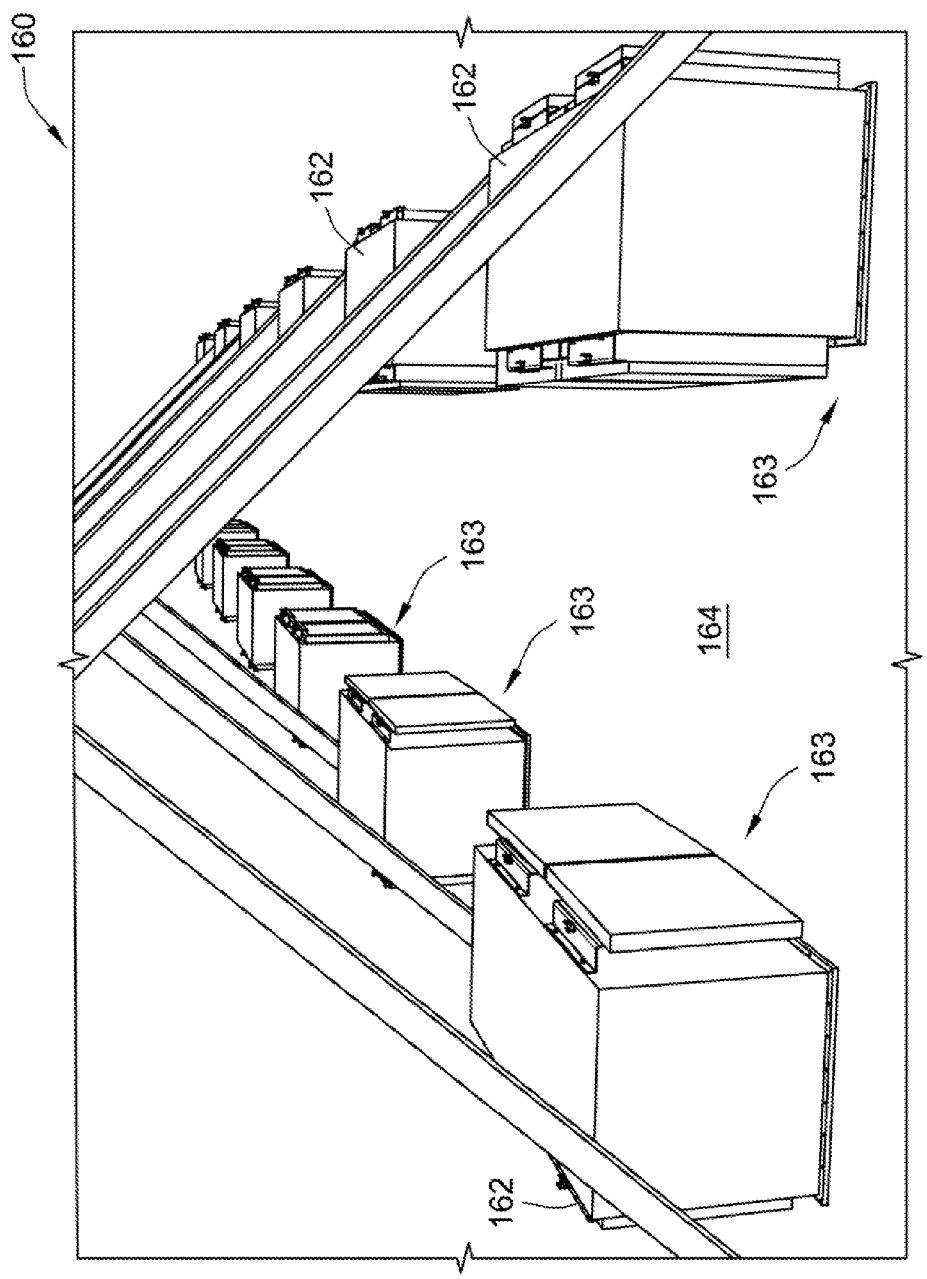
FIG. 10 is an exemplary embodiment of a portion of an animal confinement facility with a plurality of filter systems constructed in accordance with an embodiment of the invention.

FIG. 10 illustrates an exemplary embodiment of a portion of an animal confinement facility 160. The embodiment of FIG. 10 shows an attic portion of animal confinement facility 160 having a plurality of filter systems 162, constructed in accordance with an embodiment of the invention. Each of these exemplary filter systems 162 comprise the filter housing 100 (shown in FIG. 7), V-bank filter elements 138 (shown in FIG. 4), and panel filters 136 (shown in FIG. 7) described above. In the embodiment shown, the filter systems are installed through openings 163 in a floor 164 of the attic portion such that the filter systems 162 are visible in the ceiling (not shown) of that portion of the animal confinement facility 160 which houses the animals. It is contemplated that the filter systems 162 are configured to be used in both positive pressure air filtration systems and negative pressure air filtration systems.

As FIG. 10 shows, an animal confinement facility 160 may require a number of these filter systems 162 to properly filter the air in those facilities. As such, the ability to quickly and easily replace the V-bank filter elements 138 and pre-filtering panel filters 136, afforded by embodiments of the present invention, can reduce the amount of time needed to maintain the filter system and result in significant cost savings when compared to conventional filtering systems in which the entire housing and all filter elements therein are replaced as a unit.

Figure 11:
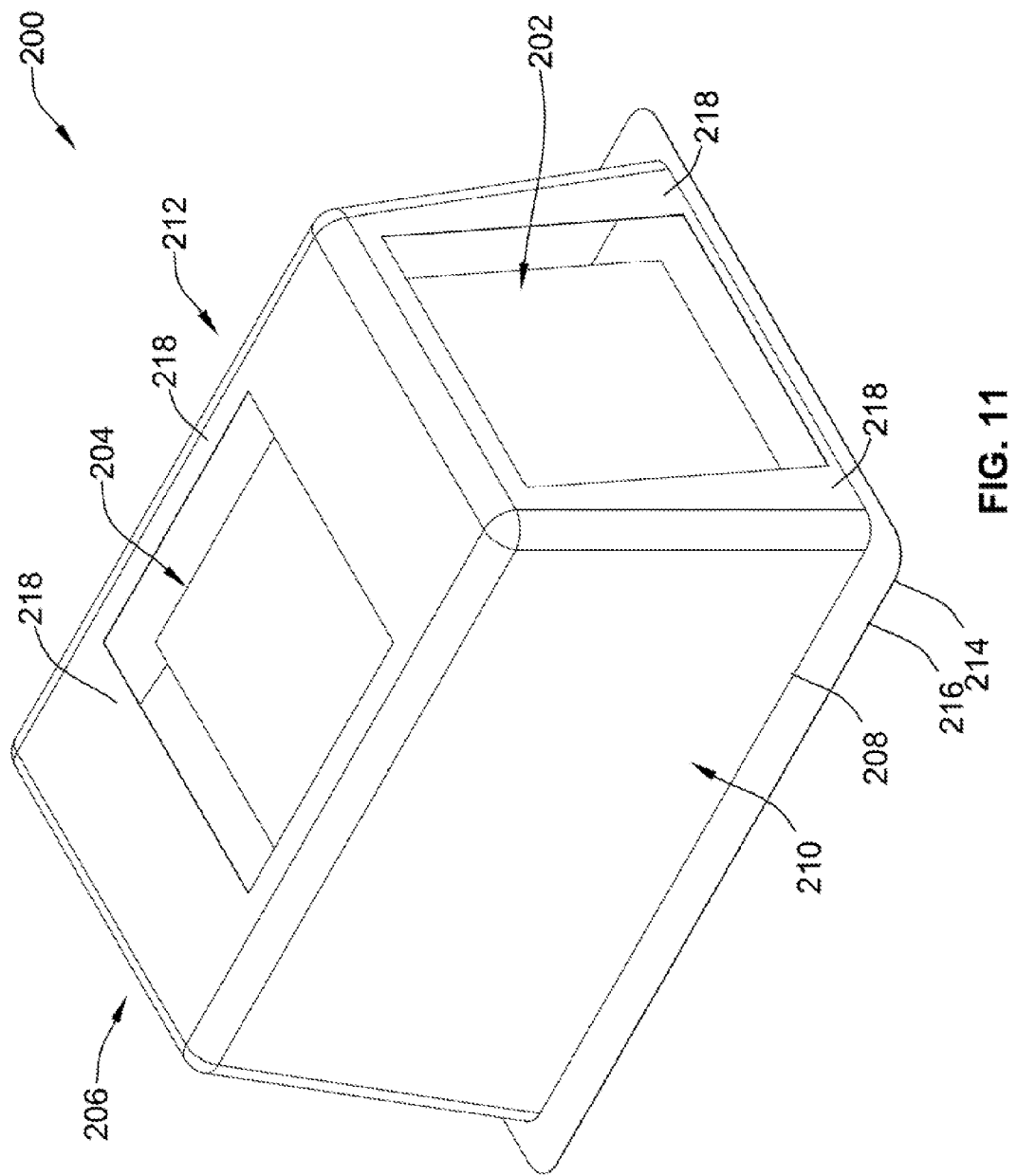
FIGS. 11-15 illustrate perspective views of various embodiments of a molded plastic filter housing, constructed in accordance with an embodiment of the invention.
Figure 12:
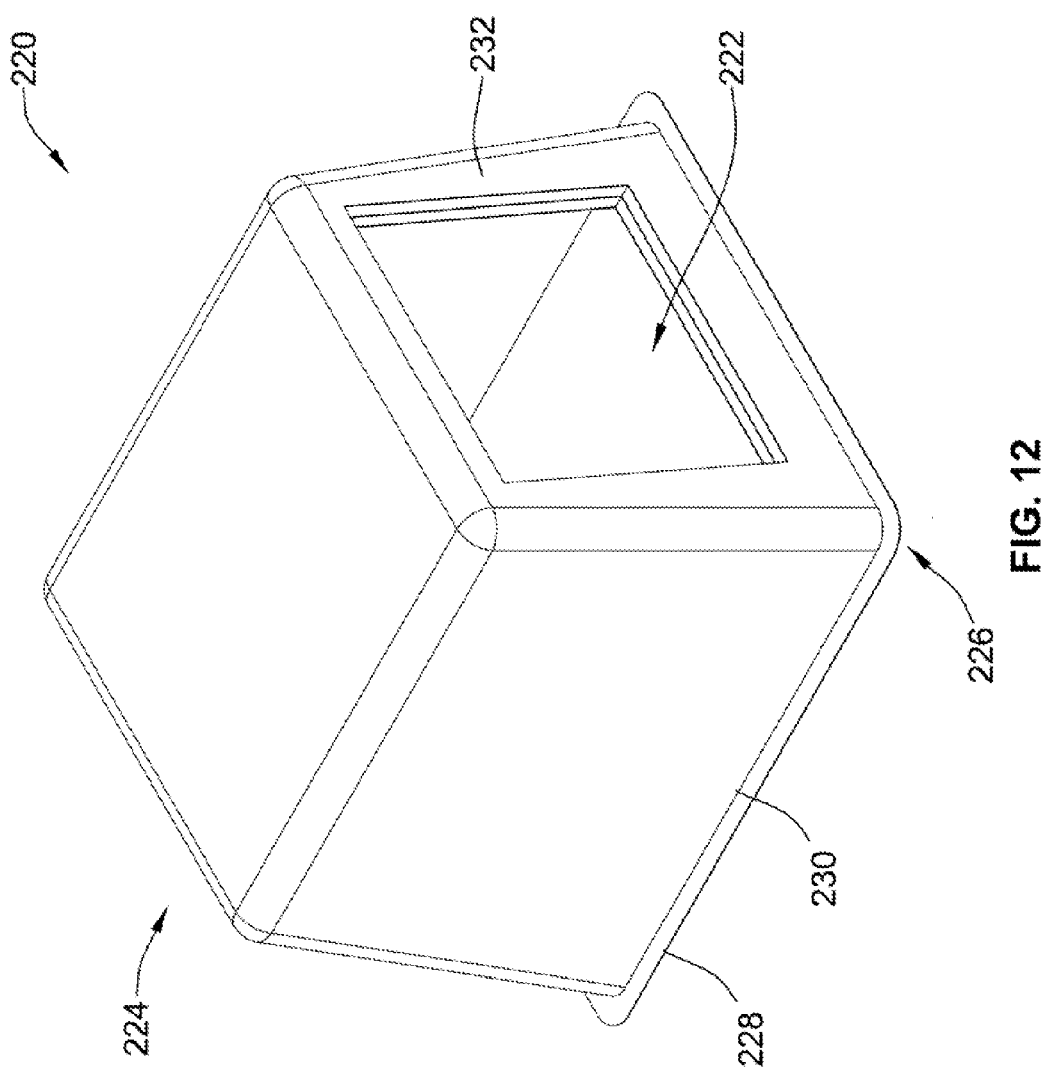
Figure 13:
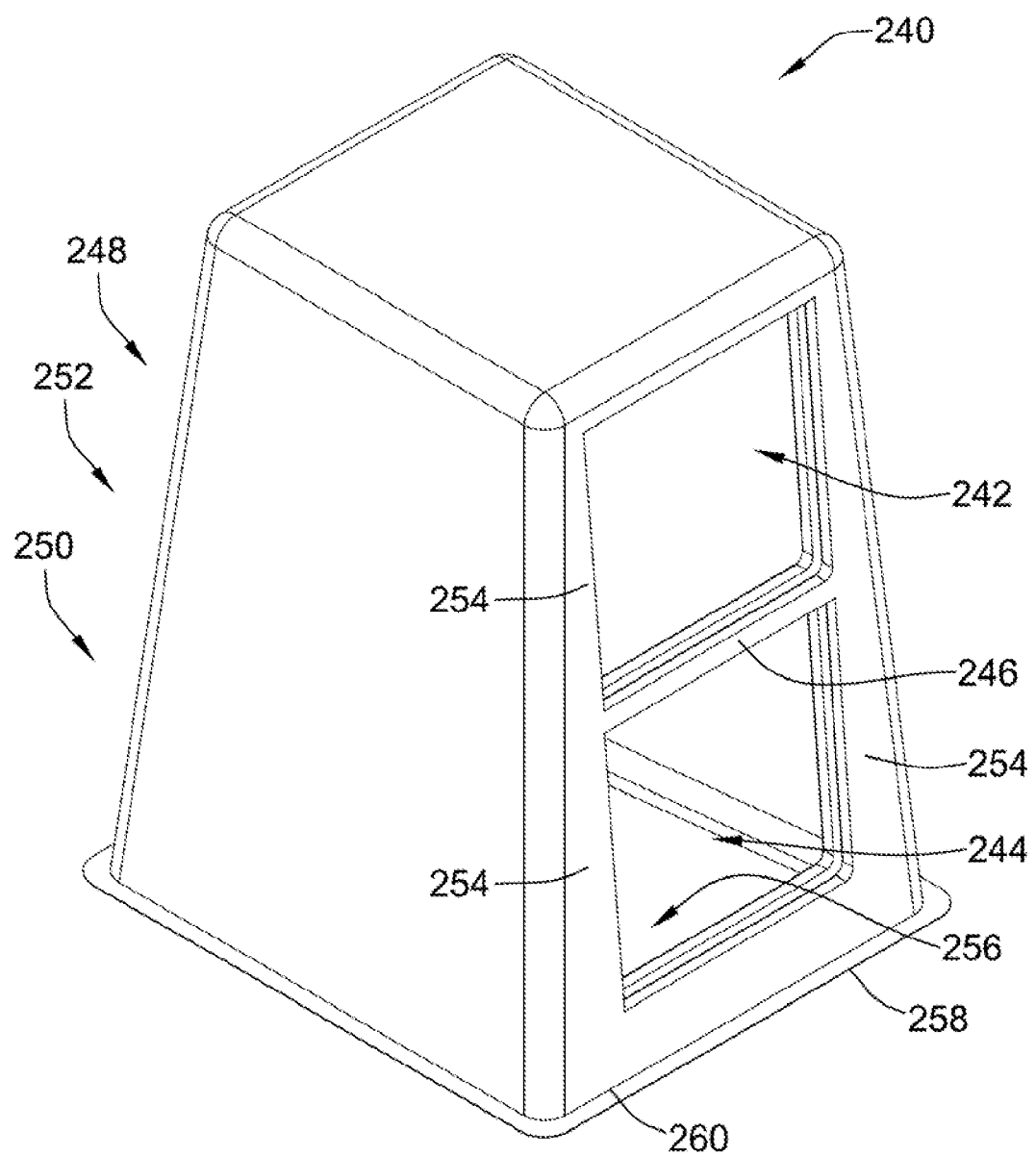

FIGS. 11-13 illustrate various embodiments of molded plastic filter housings constructed in accordance with embodiments of the invention. FIG. 11 shows a molded filter housing 200 with a lateral-side inlet opening 202 and a top-side inlet opening 204. Some embodiments of molded filter housing 200 include an optional second lateral-side opening 206. Each opening 202, 204, 206 is configured to accommodate a V-bank filter element 138 (shown in FIG. 5) or single-header box filter 186 (shown in FIG. 6). Around each opening 202, 204, 206 on the outside of the filter housing 200, there is a seating surface 218 configured to accommodate a V-bank flange 142 or the flange 190 of the box filter 186. Molded filter housing 200 further includes a bottom side outlet opening 208 through which filtered air flows out of the filter housing 200. In at least one embodiment, the molded filter housing 200 has no openings in the front side 210 or back side 212. Edges and corners for the substantially box-shaped filter housing 200 are rounded for safety and ease of handling. A flange 214 runs around a perimeter 216 at the base of the filter housing 200. In an embodiment of the invention, the flange 214 has openings for fasteners, which may be used, for example, in the installation of the filter housing 200.

FIG. 12 illustrates a molded plastic two-filter housing 220, according to an embodiment of the invention. Two-filter housing 220 has a first lateral-side inlet opening 222 and a second lateral-side inlet opening 224. The two-filter housing 220 has a relatively small footprint and can be installed in areas where space is limited. Each opening 222, 224 is configured to accommodate a V-bank filter element 138 (shown in FIG. 5) or single-header box filter 186 (shown in FIG. 6). Around each opening 222, 224 on the outside of the filter housing 220, there is a seating surface 232 configured to accommodate a V-bank flange 142 or the flange 190 of the box filter 186. Molded two-filter housing 220 further includes a bottom side outlet opening 226 through which the filtered air flows out of the filter housing 220. Edges and corners for the substantially box-shaped filter housing 220 are rounded for safety and ease of handling. A flange 228 runs around a base perimeter 230 of the filter housing 220. In a particular embodiment of the invention, the flange 228 has openings for fasteners, which may be used, for example, in the installation of the filter housing 220.

FIG. 13 illustrates a molded plastic filter housing 240, according to an embodiment of the invention. In a particular embodiment, filter housing 240 has the same footprint as the two-filter housing 220, allowing it to be used in spaces where square footage is limited but has enough vertical space to accommodate the increased height of filter housing 240. The filter housing 240 has two stacked front-side inlet openings 242, 244 separated by a first horizontal divider 246, and two back-side inlet openings 248, 250 separated by a second horizontal divider 252. While the back-side inlet openings 248, 250 and second horizontal divider 252 are not visible in FIG. 13, each is substantially similar to the inlet openings 242, 244 and divider 246 shown on the front side of filter housing 240. Each opening 242, 244, 248, 250 is configured to accommodate a V-bank filter element 138 (shown in FIG. 5) or single-header box filter 186 (shown in FIG. 6). Around each opening 242, 244, 248, 250 on the outside of the filter housing 240, there is a seating surface 254 configured to accommodate a V-bank flange 142 or the flange 190 of the box filter 186. Molded filter housing 240 further includes a bottom-side outlet opening 256 through which filtered air flows out of the filter housing 240. A flange 258 runs around a perimeter 260 at the base of the filter housing 240. In at least one embodiment of the invention, the flange 258 has openings for fasteners, which may be used, for example, in the installation of the molded filter housing 300.

Figure 14:
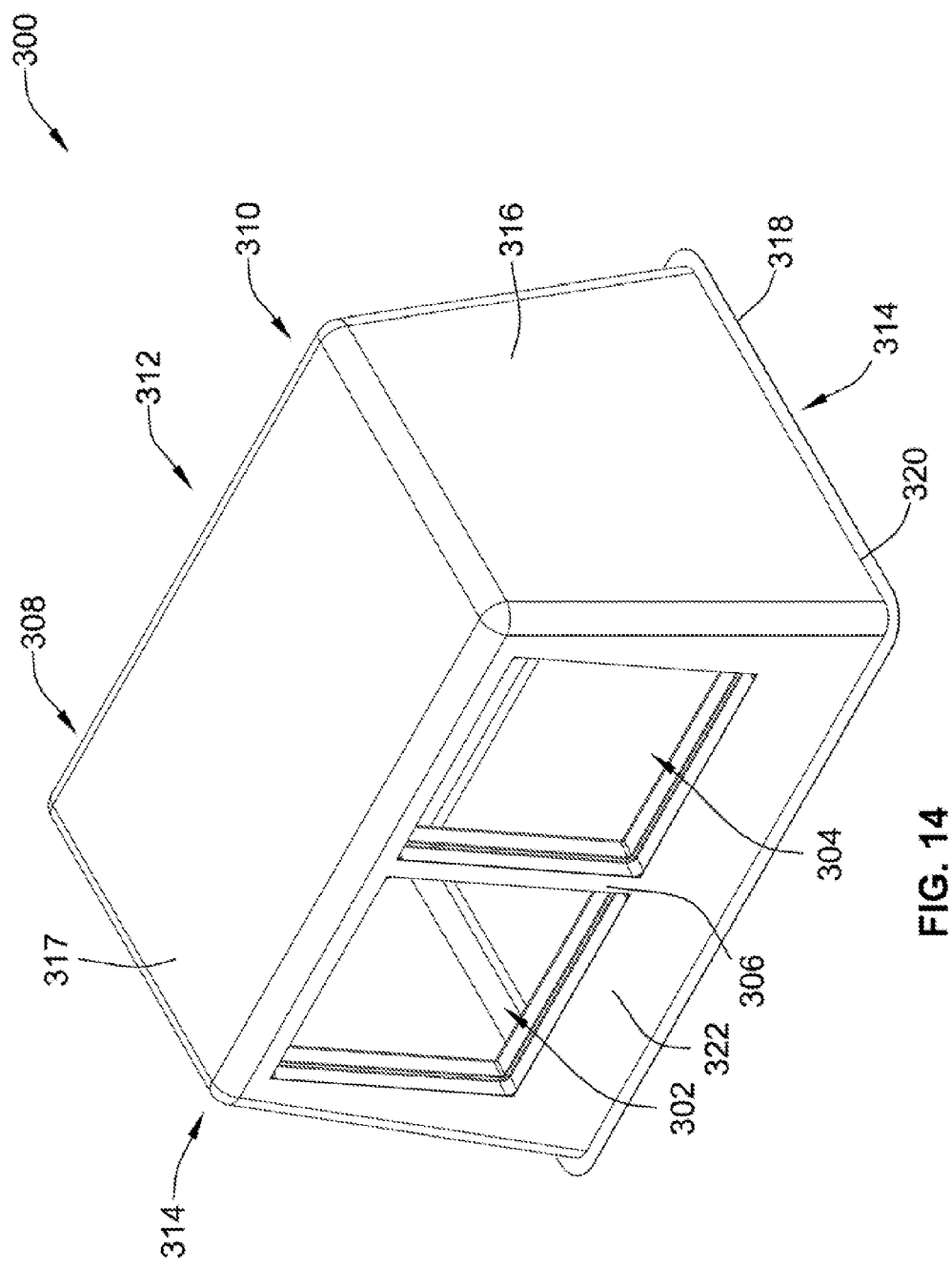

FIG. 14 shows a molded filter housing 300 with two adjacent front-side inlet openings 302, 304 separated by a first vertical divider 306, and two back-side inlet openings 308, 310 separated by a second vertical divider 312. While the back-side inlet openings 308, 310 and vertical divider 312 are not visible in FIG. 14, each is substantially similar to the inlet openings 302, 304 and divider 306 shown on the front side of filter housing 300. Each opening 302, 304, 308, 310 is configured to accommodate a V-bank filter element 138 (shown in FIG. 5) or single-header box filter 186 (shown in FIG. 6). Around each opening 302, 304, 308, 310 on the outside of the filter housing 300, there is a seating surface 322 configured to accommodate a V-bank flange 142 or the flange 190 of the box filter 186. Molded filter housing 300 further includes a bottom-side outlet opening 314 through which filtered air flows out of the filter housing 300. In at least one embodiment, the molded filter housing 300 has no openings in the lateral sides 316, or in top side 317. Edges and corners for the substantially box-shaped filter housing 300 are rounded. A flange 318 runs around a perimeter 320 at the base of the filter housing 300. In an embodiment of the invention, the flange 316 has openings for fasteners, which may be used, for example, in the installation of the molded filter housing 300.

Figure 15:
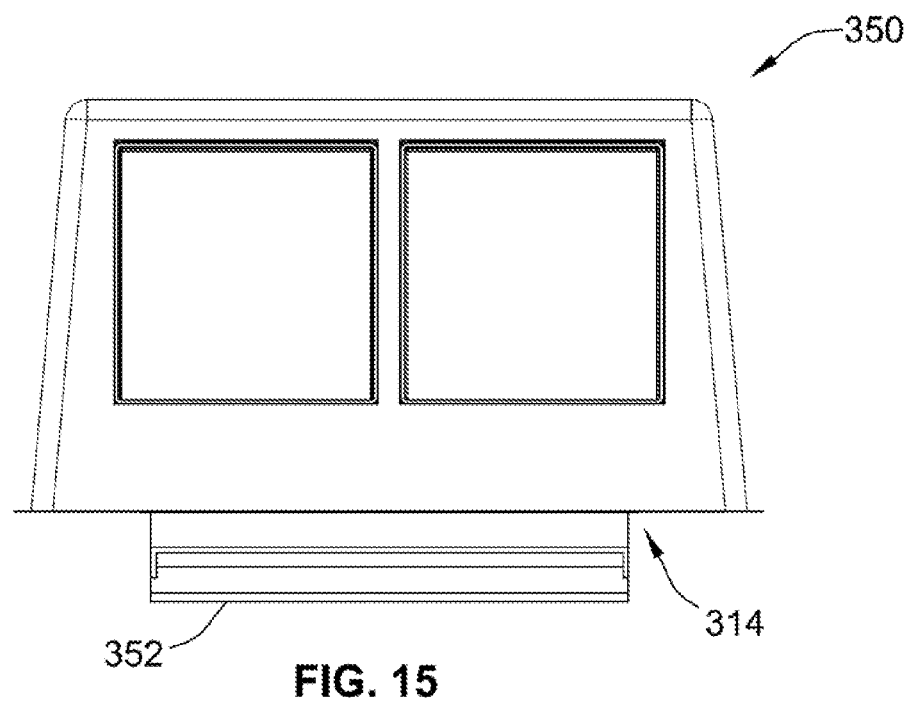

Typically, when animal confinement buildings are retrofitted to add filtering units, already-existing air inlets in the ceiling have to be sealingly covered by the new filter housing. However, FIG. 15 illustrates an alternate embodiment of the molded plastic filter housing of FIG. 14 which can make such a retrofit easier to implement. The FIG. 15 molded plastic filter housing 350 includes a covering 352 for outlet opening 314, thus allowing for the filter housing 350 to be integrated with the building air inlet (not shown) into one self-contained unit providing better seal integrity during installation. In at least one embodiment the covering 352 comprises louvered panels. This type of integrated filter housing/air inlet configuration also provides advantages when compared to conventional filtering units, in terms of cost and ease of installation when used during initial construction.

Figure 16:
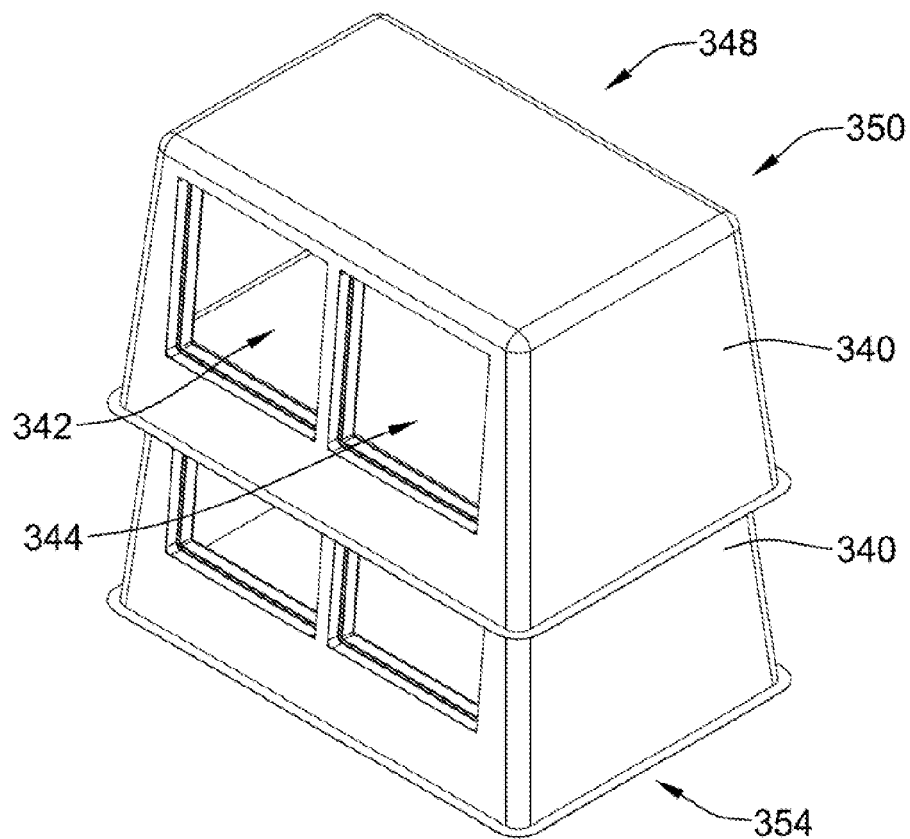
FIGS. 16-17 provide perspective views of molded plastic filter housings according to an embodiment of the invention in which the filter housings are nested.

FIG. 16 illustrates the molded filter housing 340 showing the potential for the nesting of multiple molded filter housings 340 such that the storage and transportation of these molded filter housings 340 may be more efficient than that for filter housings which are not nestable. In the embodiment of FIG. 16, filter housings 340 each have four inlet openings 342, 344, 348, 350 capable of accommodating four V-bank filter elements 138 (shown in FIG. 5) or four single-header box filters 186 (shown in FIG. 6). Each filter housing 340 has a bottom-side outlet opening 354, which constitutes substantially the entire bottom side of the filter housing 340. Opening up the entire bottom side of the filter housing 340 facilitates the aforementioned nestability. Other filter housing configurations may also be nestable in this fashion. For example, the two-filter housing 220 of FIG. 12 and the filter housing 240 of FIG. 13 can be made such that the filter housings 220, 240 are nestable.

Figure 17:
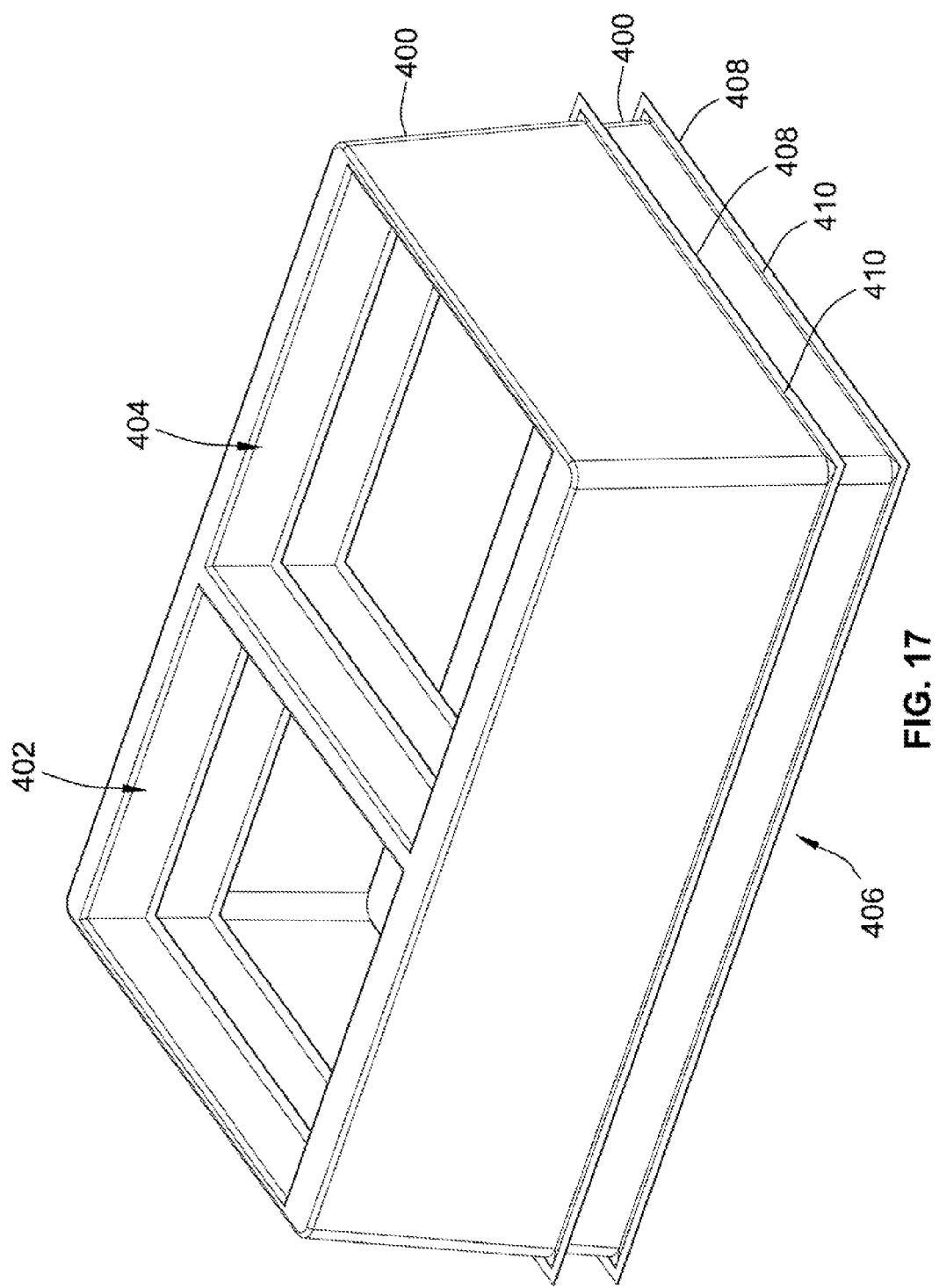

FIG. 17 illustrates an alternate embodiment of a molded filter housing 400 configured to be nested with other molded filter housings 400. In the embodiment shown in FIG. 17, each molded filter housing 400 has two adjacent top-side inlet opening 402, 404 and further includes a bottom-side outlet opening 406. The filter housing 400 also includes rounded edges and corners. As can be seen in FIG. 17, in at least one embodiment, molded filter housing 400 has no inlet openings on the front, back, or lateral sides. A flange 408 runs around a perimeter 410 at the base of the filter housing 400. In an embodiment of the invention, the flange 408 has openings for fasteners, which may be used, for example, in the installation of the molded filter housing 400.

Figure 18:
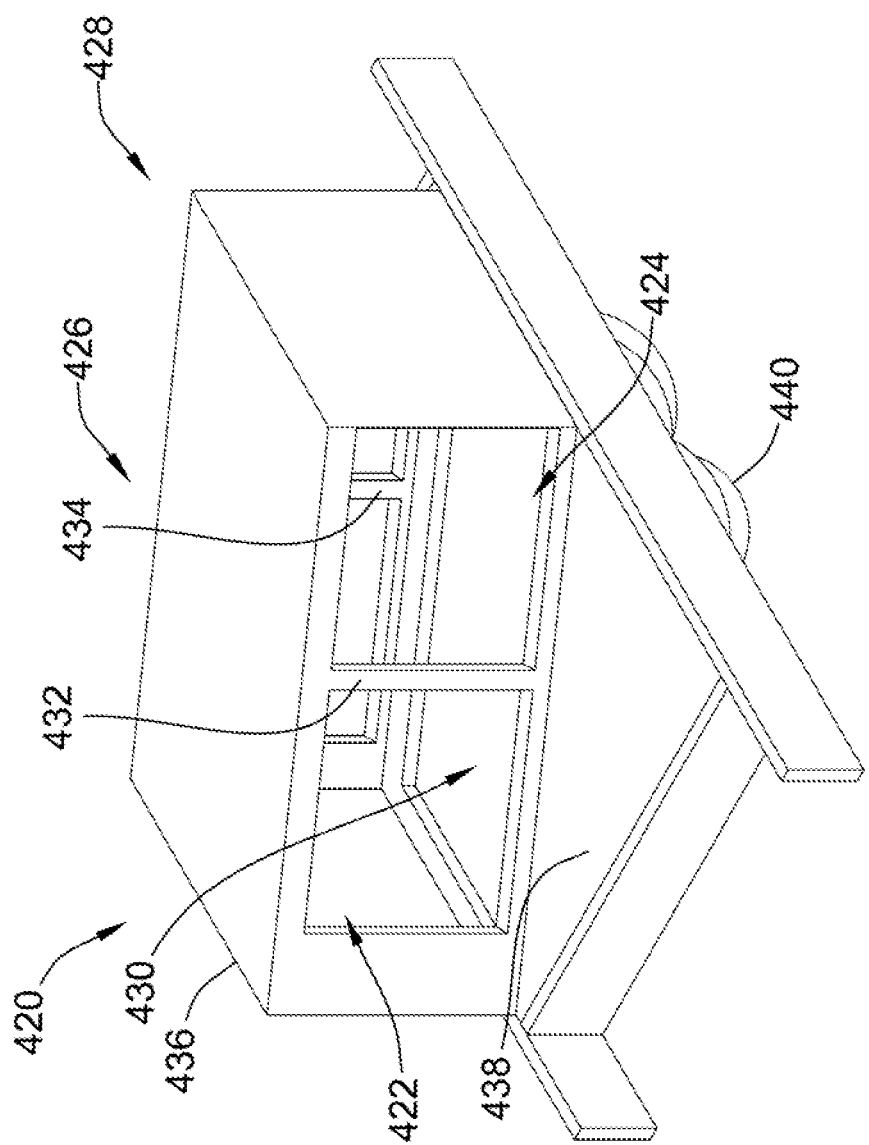
FIG. 18 is a perspective view of an angled filter housing constructed in accordance with an embodiment of the invention.

FIG. 18 is a perspective view of a four-filter angled filter housing 420, which may be constructed of metal or molded plastic. In an embodiment of the invention, the angled housing 420 includes two front-side inlet openings 422, 424, two rear-side inlet openings 426, 428 (not visible in FIG. 18), and a bottom-side outlet opening 430. The front-side inlet openings 422, 424 are separated by a first vertical divider 432, while the rear-side inlet openings 426, 428 are separated by a second vertical divider 434. In a particular embodiment of the invention, the angled filter housing further includes an angled box portion 436 that rests on a rectangular base 438. The rectangular base 438 is configured to cover a rectangular space between the ceiling beams and rafters in an animal confinement facility, for example, where the rectangular space includes one of the air vents for the facility. In an embodiment, the angled filter housing 420 includes a covering 440 for opening 430, similar to that shown on filter housing 350 (in FIG. 15). The covering 440 allows for the filter housing 350 to be integrated with the building air inlet (not shown) into one self-contained unit providing better seal integrity during installation. In at least one embodiment the covering 440 comprises louvered panels.

The molded plastic filter housings of FIGS. 11-18 may be made by rotational molding or blow molding, as well as conventional injection molding techniques. Rotational molding and blow molding may be used to improve the uniformity of wall thickness and to reduce porosity in molded parts. Constructing these filter housings from thermoplastic makes the filter housing less susceptible to rust, corrosion and rot. Further, by constructing the filter housing a single molded piece with no assembly required, manufacturing of the housings may be faster and less expensive. Additionally, the molded filter housings have no seams or leaks associated therewith that would allow for the bypass of unfiltered air.

Figure 19:
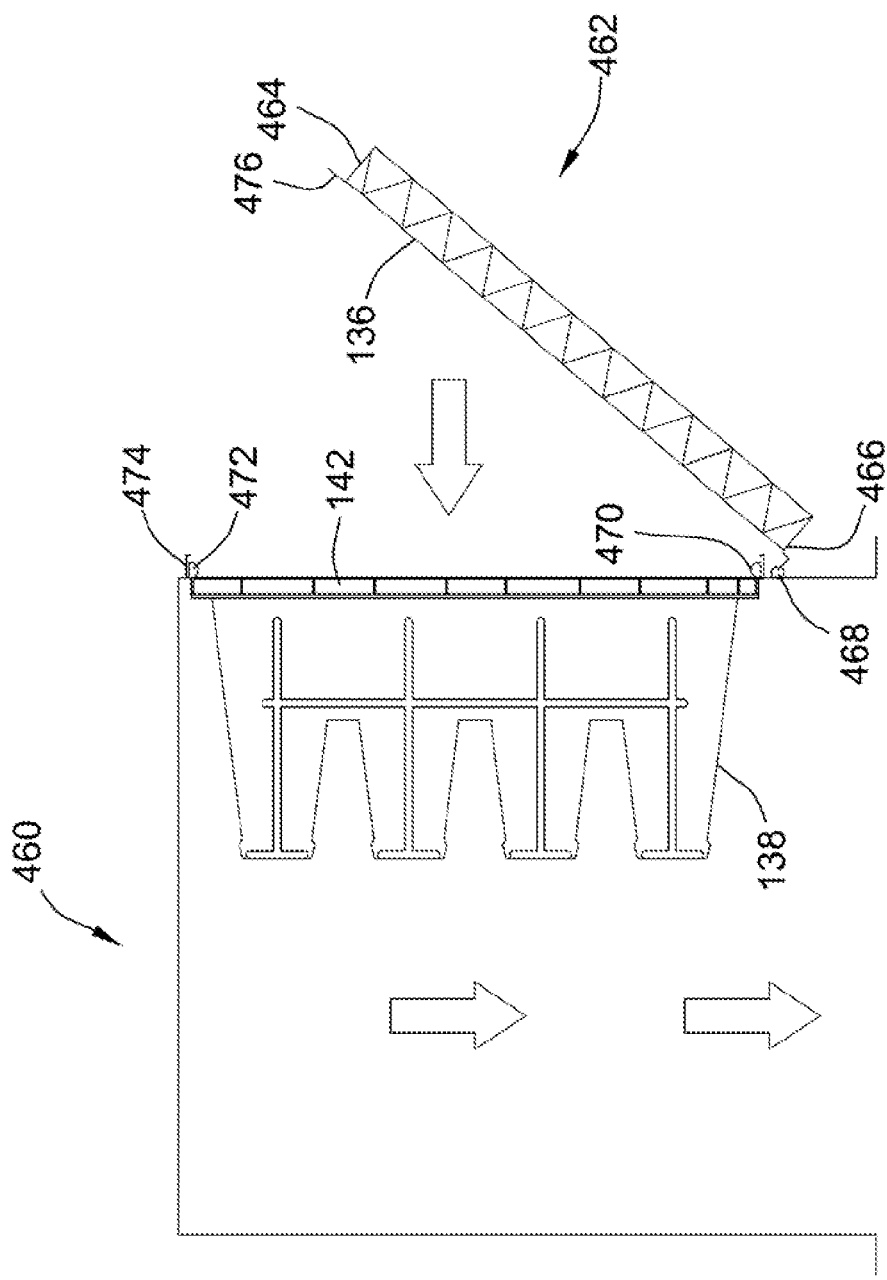
FIG. 19 is a cross-sectional view of a molded plastic filter housing with a molded plastic door, constructed in accordance with an embodiment of the invention.

Another feature of molded filter housings, namely the smooth seam-free interior and round corners and edges, result in high flow-through rates for airstreams flowing within the housings. Furthermore, the rounded edges and corners allow for the interior of the filter housing to be more easily clean than many conventional filter housings, and generally provide fewer areas for bacterial growth than conventional filter housings. In embodiments of the invention, molded filter housings may include features that facilitate the rapid assembly of pivoting doors over the inlet openings, and of retaining mechanisms for securing a V-bank filter in the filter housings. FIG. 19 illustrates a cross-sectional view of a filter housing 460 including a housing door 462 that could be employed on any of the molded filter housings in FIGS. 11-18.

In a particular embodiment, the housing door 462 is made from molded plastic, though in alternate embodiments, the housing door 462 is metal. The housing door 462 has a frame 464 configured to house a panel pre-filter 136. As shown in the embodiment of FIG. 19, a bottom side of the housing door 462 includes a lower retainer 466, which may have a stepped shape and may be integrally molded into the housing door 462. In at least one embodiment, the lower retainer 466 is configured to assemble to a hinge 468, which is integrally molded into a lower portion on the front of the housing 460. A lower clip 470 proximate the hinge 468 is molded into a lower portion on the front of the housing 460, and an upper clip 472 is molded into an upper portion of the housing 460 to secure the V-bank filter 138 to the housing 460. In a particular embodiment, the molded plastic clips 470, 472 can be deformed to allow the flange 142 of the V-bank filter 138 to seat against the housing 460. When released, the clips 470, 472 return to their normal position covering the flange 142 and holding the V-bank filter 138 in place. In an embodiment, a door latch 474 proximate the upper clip 472 is integrally molded into the housing 460 and is configured to receive a small bar or rod 476 extending from a top side of the housing door frame 464. The door latch is configured to be deformable in an upward direction, in the orientation of FIG. 19, to allow the housing door 462 to close. When the door latch 474 is released, it returns to its normal position and secures the housing door 462 in the closed position.

Figure 20:
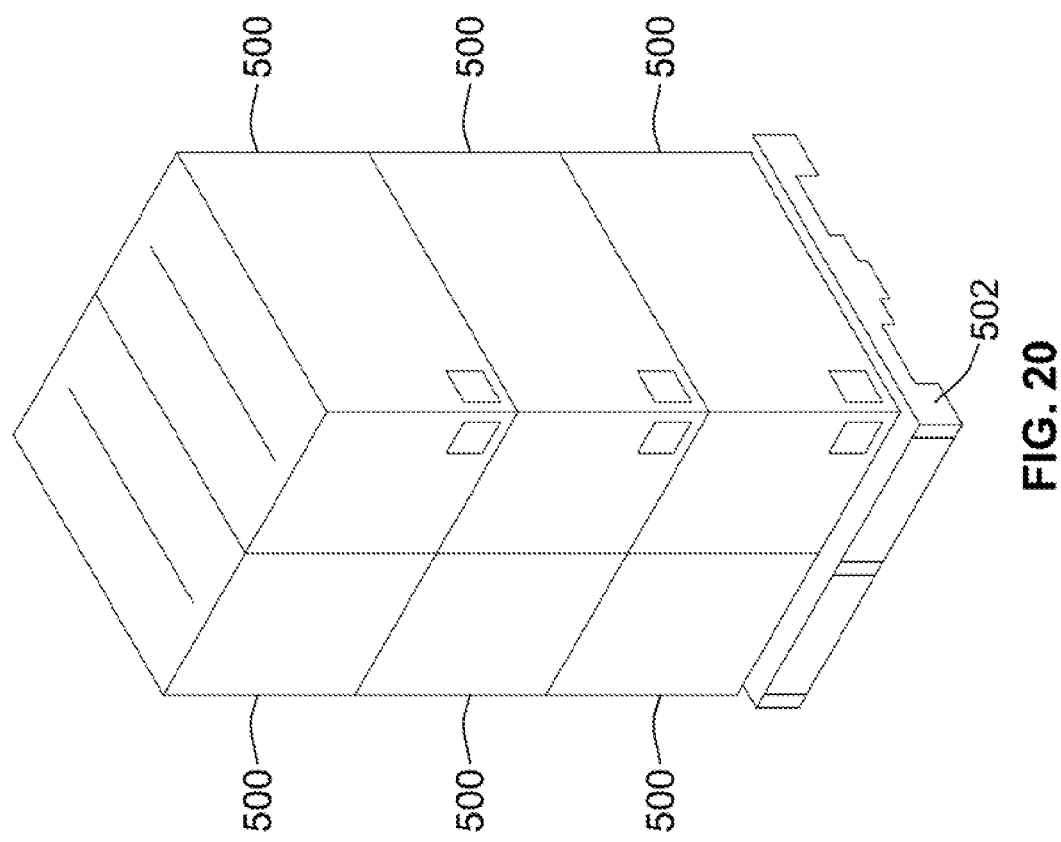
FIG. 20 is a perspective view of a filter system kit incorporating filter housings constructed in accordance with embodiments of the invention.

It is envisioned that any of the filter housings described herein could be packaged in kit form. In an embodiment, the filter kit would be configured such that all of the filter kit packaging would be designed to fit inside of the housing so as to reduce freight costs associated with the filters systems. FIG. 20 illustrates an exemplary embodiment of a filter kit 500 packaged for shipment. In the embodiment of FIG. 20, six filter kits 500 are staged on a pallet 502. In each filter kit 500, all filters, including V-bank or box header filters along with panel pre-filter, are stored in the filter housing (not shown). Thus, the box containing the filter kit 500 will have approximately the same dimensions as the filter housing. This efficient use of space results in lower shipping costs for users of the filter kits 500.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An animal confinement facility comprising:
   a building having a building air inlet opening into a portion of the building where animals are housed;
   a filter system positioned adjacent the building air inlet opening to filter disease agents from the air passing into the portion of the building where animals are housed through the building air inlet opening, the filter system including:
      a plastic housing including an inlet opening and an outlet opening, the outlet opening being formed in a first side of the housing, the housing being mounted to the building with the outlet opening adjacent the building air inlet opening, the inlet opening being formed in a different side of the housing than the outlet opening, the plastic housing defining a sealing surface surrounding the inlet opening;
      a primary filter positioned in the inlet opening, the primary filter having a flange in general alignment with the sealing surface, the primary filter having at least one filter media section operably sealingly attached to the flange, the at least one filter media section extending into an interior of the housing interposed between the inlet opening and outlet opening and fluidly upstream from the outlet opening;
   a seal between the flange of the primary filter sealing surface.

2. The animal confinement facility of claim 1, further comprising a pre-filter fluidly upstream from the at least one filter media section of the primary filter.

3. The animal confinement facility of claim 1, wherein the primary filter is selected from the group consisting of: a V-bank filter and a single-header box filter.

4. The animal confinement facility of claim 1, wherein the building has a plurality of openings into the portion where animals are housed, each opening having a corresponding filter system adjacent thereto.

5. The animal confinement facility of claim 1, wherein the filter housing is formed from rotational molding plastic into a single piece.

6. The animal confinement facility of claim 1, wherein the building air inlet opening is formed in a ceiling of the portion of the building where animals are housed.

7. The animal confinement facility of claim 1,
   wherein the primary filter is configured to fit inside of the filter housing during shipment of the filter system.

8. The animal confinement facility of claim 7, wherein the primary filter is one or more V-bank filters configured to fit inside of the filter housing during shipment of the filter system, the sealing arrangement of the one or more V-bank filters having a sealing flange operably coupled to the filter media sections.

9. The animal confinement facility of claim 7, wherein the primary filter is one or more single header box filters configured to fit inside of the filter housing during shipment of the filter system, the sealing arrangement of the one or more single header box filters having a sealing flange operably coupled to the filter media sections.

10. The animal confinement facility of claim 9, wherein each of the one or more single-header box filter comprises filter media at least as efficient as a MERV 15 filter media.

11. The animal confinement facility of claim 7, further comprising a panel pre-filter configured to be mounted upstream of the filter when in operation to prefilter the air prior to the primary filter, the primary filter and panel pre-filter configured to be positioned within the filter housing during shipment.

12. The animal confinement facility of claim 11, further comprising at least one door configured to cooperate with the inlet opening, the door defining a cavity and the panel pre-filter positioned within the cavity of the door such that the panel pre-filter is carried by the door.

13. The animal confinement facility of claim 1, wherein:
   the plastic housing is a plastic rotational molded body.

14. The filter system of claim 13, further comprising a latch arrangement for releasably securing the primary filter to the body, the latch arrangement being separately attached to the rotational molded body.

15. The filter system of claim 13, wherein the primary filter is selected from the group consisting of: a V-bank filter and a single box-head filter.

* * * * *